(12) United States Patent
Murakami et al.

(10) Patent No.: US 7,918,753 B2
(45) Date of Patent: Apr. 5, 2011

(54) HYDRAULIC CONTROL UNIT

(75) Inventors: Akira Murakami, Gotenba (JP);
Makoto Funahashi, Gotenba (JP);
Shinichi Ito, Susono (JP); Toshihiro Aoyama, Susono (JP); Michio Yoshida, Susono (JP); Ryuji Ibaraki, Susono (JP); Takashi Kuwabara, Susono (JP); Toshiya Yamashita, Mishima (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 1096 days.

(21) Appl. No.: 11/570,149

(22) PCT Filed: Jun. 9, 2005

(86) PCT No.: PCT/JP2005/011076
§ 371 (c)(1),
(2), (4) Date: Dec. 7, 2006

(87) PCT Pub. No.: WO2006/011312
PCT Pub. Date: Feb. 2, 2006

(65) Prior Publication Data
US 2007/0243074 A1    Oct. 18, 2007

(30) Foreign Application Priority Data
Jun. 11, 2004  (JP) ................................. 2004-173995

(51) Int. Cl.
*F16H 61/00* (2006.01)
(52) U.S. Cl. .......................................... 474/28; 474/18
(58) Field of Classification Search ............... 474/18, 474/28; 251/57; 137/488, 199.01, 494, 155.15; 192/85.63, 13.57; 91/466, 468; 184/6.3
See application file for complete search history.

(56) References Cited

U.S. PATENT DOCUMENTS

| | | | |
|---|---|---|---|
| 4,955,195 A * | 9/1990 | Jones et al. ................... 60/405 |
| 5,794,739 A * | 8/1998 | Ring et al. ................. 188/153 R |
| 6,386,170 B1 | 5/2002 | Iwano et al. |
| 6,428,445 B1 * | 8/2002 | Friedmann et al. ............. 477/44 |
| 6,517,455 B1 * | 2/2003 | Van Wijk et al. ................ 474/18 |
| 2005/0121283 A1 * | 6/2005 | Brissenden et al. ......... 192/85 R |

FOREIGN PATENT DOCUMENTS

| | | |
|---|---|---|
| DE | 947 669 | 8/1956 |
| DE | 101 28 867 | 12/2002 |
| EP | 0 286 924 | 10/1988 |
| JP | 07-019159 | 1/1995 |
| JP | 2002 115755 | 4/2002 |
| WO | 99 32806 | 7/1999 |

\* cited by examiner

*Primary Examiner* — Robert A Siconolfi
*Assistant Examiner* — Anna Momper
(74) *Attorney, Agent, or Firm* — Oblon, Spivak, McClelland, Maier & Neustadt, L.L.P.

(57) ABSTRACT

A hydraulic control unit (18), for a power transmission system having an oil receiving device (26,37), which controls a power transmitting condition of the power transmission system, and an oil reserving device for feeding the oil to the oil receiving device, wherein the oil reserving device comprises a piston (59) in which a diametrically large portion and a diametrically small portion are arranged integrally and coaxially, a first hydraulic chamber (57) in which the diametrically large portion, and a second hydraulic chamber (58) in which the diametrically small portion are housed liquid-tightly and movably back and forth; and an oil feeding amount control device for feeding the oil of the first hydraulic chamber to the oil receiving device, by raising the oil pressure in the second hydraulic chamber (58) to operate the piston (59).

30 Claims, 15 Drawing Sheets

HYDRAULIC CONTROL UNIT

TECHNICAL FIELD

This invention relates to a hydraulic control unit for controlling a condition of a power transmission system for vehicles hydraulically.

BACKGROUND ART

In a vehicle according to the prior art, a power transmission system is provided on the route from a prime mover to a wheel, and a hydraulic control unit, an electromagnetic type control system or the like are known as a mechanism for controlling the condition of the power transmission system. One example of the hydraulic control unit for vehicles is disclosed in Japanese Patent Laid-Open No. 2002-115755. The vehicle suggested by this Laid-Open has an engine, and the engine torque is transmitted to the wheel through a torque converter, an automatic transmission and a differential. The automatic transmission comprises a geared transmission capable of setting a plurality of forward gear stages, and a reverse gear stage. Also, there are provided a C1 clutch, which is applied in case the forward gear stage is selected, and a C2 clutch, which is applied in case the reverse gear stage is selected. The C1 and C2 clutches are applied by raising the operating oil pressure to be fed, and released by reducing the operating oil pressure.

Also, there is provided a hydraulic control unit for controlling the condition of operating oil fed to the C1 clutch, the C2 clutch, the torque converter and so on. The hydraulic control unit has an oil pump driven by the power of the engine. The operating oil discharged from the oil pump is fed to a manual valve through a primary regulator valve. Two oil passages diverge from the manual valve. One of those oil passages is connected with a hydraulic chamber of the C1 clutch, and the other one is connected with a hydraulic chamber of the C2 clutch. On the route from the manual valve to the hydraulic chamber of the C1 clutch, a first oil passage and a second oil passage are arranged in parallel. The first oil passage is equipped with a selector valve, and the second oil passage is equipped with an orifice. Also, there is provided a line-pressure control solenoid for controlling the primary regulator valve. Moreover, a clutch oil passage is arranged to connect the primary regulator valve and the manual valve, and an accumulator having a piston and a spring is connected with the clutch oil passage. Furthermore, an accumulator control solenoid is provided on the route from the clutch oil passage to the accumulator.

In the hydraulic control unit thus constructed, the oil pump is driven by the engine power, and the operating oil discharged from the oil pump is fed to the clutch oil passage through the primary regulator valve. Pressure of the operating oil in the clutch oil passage is controlled by the line-pressure control solenoid. In case any of shift positions such as, D position, 4th position, 3rd position, 2nd position and L position is selected, the operating oil in the clutch oil passage is fed to the hydraulic chamber of the C1 clutch through the manual valve. As a result of this, the C1 clutch is applied. At the same time, the operating oil is discharged from the hydraulic chamber of the C2 clutch so that the C2 clutch is released. In case the later-described "ECO-run control", is not carried out, the selector valve is closed when the operating oil is fed to the hydraulic chamber of the C1 clutch. Here, the "ECO-run control" is a coined term to describe a control to run the vehicle "ECOnomically and ECOlogically". Therefore, the operating oil is fed to the hydraulic chamber of the C1 clutch comparatively slowly through the second oil passage. In case R position is selected, on the contrary, the operating oil in the clutch oil passage is fed to the hydraulic chamber of the C2 clutch through the manual valve so that the C2 clutch is applied. At the same time, the operating oil is discharged from the hydraulic chamber of the C1 clutch. Consequently, the C1 clutch is released.

According to the vehicle suggested by Japanese Patent Laid-Open No. 2002-115755, the aforementioned "ECO-run control" can be carried out. For example, in case the vehicle is running in an urban area and the shift position is D position, the engine is stopped automatically when the vehicle is waiting at the traffic light and an automatic stop condition is satisfied. The automatic stop condition can be exemplified by the conditions such as the accelerator is OFF, the brake is ON, the vehicle speed is zero or the like. On the contrary, the engine is restarted in case the automatic stop condition is no longer satisfied. Thus, the "ECO-run control" is the control to stop and restart the engine automatically, according to satisfaction or dissatisfaction of the automatic stop condition. In case the "ECO-run control" is carried out, the engine is stopped automatically so that the oil pump is halted and the oil is not fed to the C1 clutch. For this reason, a response of the C1 clutch may be degraded in case the C1 clutch is applied again after the engine is restarted.

According to the Japanese Patent Laid-Open No. 2002-115755, therefore, a rapid boosting control is carried out in case of feeding the operating oil to the C1 clutch when the engine is restarted. That is, the operating oil is promptly fed to the hydraulic chamber of the C1 clutch through the first oil passage by opening the selector valve, so that an application of the C1 clutch is thereby facilitated. In addition to the rapid boosting control, the accumulator control solenoid is opened to feed the operating oil reserved in the accumulator to the hydraulic chamber of the C1 clutch through the clutch oil passage. This increases flow rate of the operating oil fed to the hydraulic chamber of the C1 clutch.

Meanwhile, according to the Japanese Patent Laid-Open No. 2002-115755, a spring constant dominates operating characteristics of the accumulator which facilitates to increases the feeding amount of the operating oil to the hydraulic chamber of the C1 clutch. From this point of view, it is still required to improve feeding efficiency of the operating oil to the hydraulic chamber of the C1 clutch.

DISCLOSURE OF THE INVENTION

The present invention has been conceived noting the technical problems thus far described, and its object is to provide a hydraulic control unit capable of improving the feeding efficiency of the oil fed from an oil reserving device to an oil receiving device.

A hydraulic control unit of the present invention comprises: a power transmission system arranged on a route from a prime mover to a wheel; an oil receiving device, to which the oil is fed, and which controls a power transmitting condition of the power transmission system on the basis of a feeding condition of the oil; and an oil reserving device for feeding the oil to the oil receiving device. The oil reserving device comprises a first hydraulic chamber connected with the oil receiving device, and a second hydraulic chamber. In the clearance between the first and the second hydraulic chamber, there is interposed a piston operating therebetween. The piston has a first pressure receiving face forming the first hydraulic chamber, and a second pressure receiving face forming the second hydraulic chamber. An area of the second pressure receiving face is smaller than that of the first pressure receiving face.

Moreover, there is provided an oil feeding amount control device for feeding the oil from the first hydraulic chamber to the oil receiving device, by raising the oil pressure in the second hydraulic chamber to operate the piston.

The piston also has a diametrically large portion and a diametrically small portion arranged coaxially and integrally. The diametrically large portion is housed in the first hydraulic chamber liquid-tightly and movably back and forth. The diametrically small portion is housed in the second hydraulic chamber liquid-tightly and movably back and forth. A face of the diametrically large portion facing the first hydraulic chamber is the first pressure receiving face, and a face of the diametrically small portion facing the second hydraulic chamber is the second pressure receiving face.

According to the invention, therefore, when the oil pressure is fed to the second hydraulic chamber so that the piston is moved to the first hydraulic chamber side, the oil reserved in the first hydraulic chamber is discharged to the oil receiving device. The discharge amount of the oil is larger than the feeding amount of the oil to the second hydraulic chamber. Here, the amount of the oil fed to the oil receiving device from the first hydraulic chamber is calculated by the following formula:

Amount of the oil in the second hydraulic chamber×
(Area of the first pressure receiving face/Area of
the second pressure receiving face).

That is, the flow rate of the oil fed to the second hydraulic chamber of the oil reserving device is larger than the flow rate of the oil fed to the oil receiving device from the first hydraulic chamber. Therefore, feeding efficiency of the oil to the oil receiving device is improved. For this reason, a response of pressure rise in the oil receiving device is improved, and response to control the power transmitting state of the power transmission system is improved.

For the reasons mentioned above, in the power transmission system in which the oil pump is driven by the engine which is halted and restarted automatically, it is possible to feed the oil pressure rapidly to the oil receiving device such as, a belt-type continuously variable transmission, a clutch or the like, even if the discharge amount of the oil pump is small due to restarting of the engine. Accordingly, an additional oil pump is not required to restart the engine.

The rapid feeding of the oil is carried out temporarily, e.g., only when the prime mover is restarted. Therefore, the present invention comprises a selector valve, which feeds the oil pressure to the second hydraulic chamber immediately after the oil pump is started to be driven, and stops the feeding of the oil pressure to the second hydraulic chamber after the oil pressure of the first hydraulic chamber reaches a predetermined pressure.

The oil pressure fed from the oil pump, the oil pressure of the first hydraulic chamber, or the oil pressure of the oil receiving device may be used as a signal pressure to switch over the selector valve. Alternatively, the selector valve may be operated by the signal pressure outputted from the solenoid valve which is controlled electrically.

After the oil pump starts functioning properly, the oil pressure of the oil pump is regulated to the line pressure and fed to each portion. Therefore, the aforementioned selector valve is capable of branching the oil passage from the oil pump to a pressure control valve, and communicating the branched oil passages selectively.

The aforementioned first hydraulic chamber has a function to reserve the oil therein, therefore, the piston moves backward after the oil is discharged from first hydraulic chamber, and the oil is aspirated to the first hydraulic chamber. In order to facilitate the aspiration of the oil, there is arranged a circulating oil passage connecting the first and second hydraulic chambers. The circulating oil passage is preferably connected to the oil pan through a one-way valve.

The present invention can be applied to a hydraulic control unit for controlling a belt-type continuously variable transmission, and especially to a hydraulic control unit of a vehicle in which the engine is halted automatically for the purpose of improving fuel consumption. Moreover, occurring of a belt slippage at a restarting time of the engine can also be prevented by applying the present invention to a device for feeding the oil rapidly to a hydraulic servomechanism for clamping the belt.

Furthermore, according to the invention, it is also possible to arrange an oil passage for applying the oil pressure to a third hydraulic chamber housing a rod portion situated between the diametrically large portion and the diametrically small portion of the piston. With this construction, it is also possible to move the piston to the first hydraulic chamber side by the oil pressure fed to the third hydraulic chamber.

DETAILED DESCRIPTION OF THE PREFERRED EMBODIMENT

Figure 2:
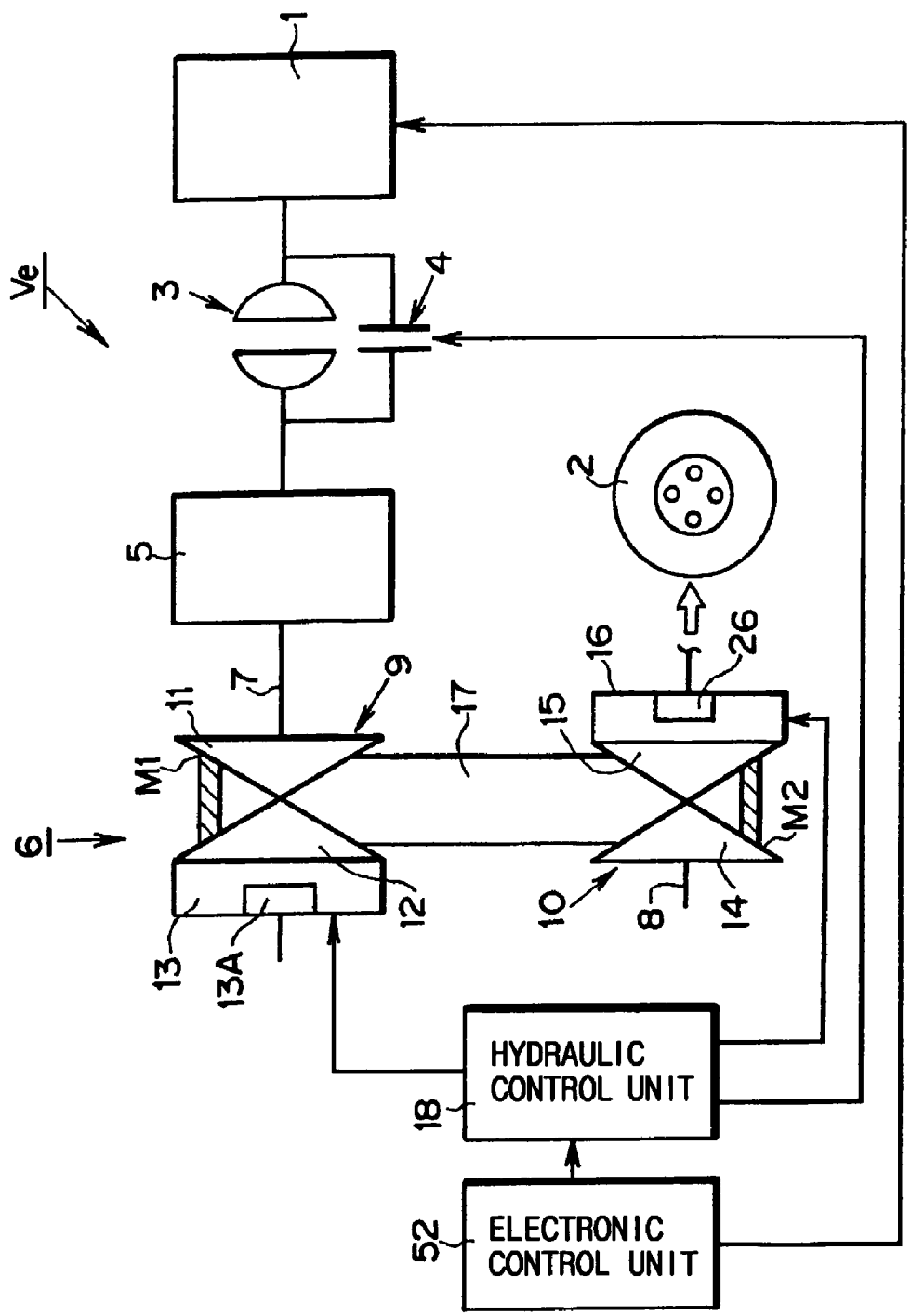
FIG. 2 is a conceptual diagram showing a power train and a control line of a vehicle to which the invention is applied.

FIG. 2 shows a power train of a vehicle having a hydraulic control unit of the invention, and a control system of the vehicle. On the power transmission route of vehicle Ve between an engine 1 and a wheel 2, there are provided a hydraulic power transmission 3, a lockup clutch 4, a forward/backward switching mechanism 5, a belt-type continuously variable transmission 6 and so on. The hydraulic power transmission 3 and the lockup clutch 4 are arranged on the power transmission route between the engine 1 and the forward/backward switching mechanism 5 in parallel with each other. This hydraulic power transmission 3 is a device for transmitting power by means of kinetic energy of the fluid, and the lockup clutch 4 is a device for transmitting power by means of frictional force.

The forward/backward switching mechanism 5 is a device for switching the rotation direction of an output member selectively, and which comprises: a (not shown) planetary gear mechanism; a (not shown) clutch for controlling the transmission state of the power to the rotary element of the planetary gear mechanism; and a (not shown) brake for controlling rotation/stop of the rotary element of the planetary gear mechanism. The applying pressures of the frictional engagement elements such as the clutch and the brake are controlled by the oil pressure. The forward/backward switching mechanism 5 itself is a known mechanism.

The belt-type continuously variable transmission 6 is placed on the power transmission route between the forward/backward switching mechanism 5 and the wheel 2, and the belt-type continuously variable transmission 6 comprises a primary shaft 7 and a secondary shaft 8 arranged in parallel with each other. The primary shaft 7 is equipped with a primary pulley 9, and the secondary shaft 8 is equipped with a secondary pulley 10. The primary pulley 9 has a fixed sheave 11 fixed with the primary shaft 7, and a movable sheave 12 which is movable in the axial direction of the primary shaft 7. Between the fixed sheave 11 and the movable sheave 12, there is formed a groove M1.

Moreover, there is provided a hydraulic servomechanism 13 for controlling the clearance between the movable sheave 12 and the fixed sheave 11 by moving the movable sheave 12 in the axial direction of the primary shaft 7. This hydraulic servomechanism 13 has a hydraulic chamber 13A, and a (not shown) piston, which is connected to the movable sheave 12, and which is capable of moving according to the oil pressure of the hydraulic chamber 13A in the axial direction of the primary shaft 7.

On the other hand, the secondary pulley 10 has a fixed sheave 14 which is fixed with the secondary shaft 8, and a movable sheave 15 which is movable in the axial direction of the secondary shaft 8. Between the fixed sheave 14 and the movable sheave 15, there is formed a v-shaped groove M2. Moreover, there is provided a hydraulic servomechanism 16 for controlling the clearance between the movable sheave 15 and the fixed sheave 14 by moving the movable sheave 15 in the axial direction of the secondary shaft 8. This hydraulic servomechanism 16 has a hydraulic chamber 26; and a (not shown) piston, which is connected with the movable sheave 15, and which is capable of moving according to the oil pressure of a hydraulic chamber 26 in the axial direction of the secondary shaft 8. An endless belt 17 is applied to the primary pulley 9 and the secondary pulley 10.

On the other hand, there is provided a hydraulic control unit 18 having a function to control the hydraulic servomechanisms 13 and 16 of the belt-type continuously variable transmission 6, the lockup clutch 4, and the forward/backward switching mechanism 5. This hydraulic control unit 18 will be described later. Moreover, there is provided an electronic control unit 52 adopted as a controller for controlling the engine 1, the lockup clutch 4, the forward/backward switching mechanism 5, the belt-type continuously variable transmission 6, and the hydraulic control unit 18. To this electronic control unit 52, there are inputted a signal of a ignition switch, and detection signals of an engine speed, an operating condition of an accelerator pedal, an opening degree of a throttle valve, a shift position, a speed of the primary shaft 7, a speed of the secondary shaft 8 and so on. Various data is stored in the electronic control unit 52, and a signal to control the engine 1, a signal to control the belt-type continuously variable transmission 6, a signal to control the forward/backward switching mechanism 5, a signal to control the lockup clutch 4, a signal to control the hydraulic control unit 18 and so on are outputted therefrom.

Here will be described the action of the vehicle Ve shown in FIG. 2. Torque of the engine 1 is inputted to the forward/backward switching mechanism 5 through at least one of the hydraulic power transmission 3 and the lockup clutch 4. Then, the torque outputted from the forward/backward switching mechanism 5 is transmitted to the wheel 2 through the belt-type continuously variable transmission 6. As a result of this, driving force is established.

In the belt-type continuously variable transmission 6, the flow rate of the oil fed to the hydraulic chamber 13A is controlled to change thrust force to move the movable sheave 12 of the primary pulley 9 in the axial direction. Also, the oil pressure of the hydraulic chamber 26 is controlled to change the thrust to move the movable sheave 15 of the secondary pulley 10 in the axial direction. Consequently, the width of the groove M1 is changed according to the axial movement of the movable sheave 12, and the width of the groove M2 is changed according to the axial movement of the movable sheave 15. As described above, the amount of the oil fed to the hydraulic chamber 13A is controlled to control the speed change ratio of the belt-type continuously variable transmission 6, and the oil pressure of the hydraulic chamber 26 is controlled to change the clamping pressure applied to the belt 17, thereby regulating torque capacity of the belt-type continuously variable transmission 6.

According to the vehicle Ve shown in FIG. 2, basically, the engine 1 can be started and halted selectively on the basis of the signal of ignition switch. However, the engine 1 can also be started and halted on the basis of a condition other than the signal of the ignition switch. For example, in case all the after-mentioned conditions are detected when the engine 1 is driven, a condition to halt the engine 1 is satisfied. This halting control of the engine 1 is allowed to be carried out when all the following conditions are detected such as, a shift position is a drive position, the accelerator pedal returns to the initial position, the brake pedal is depressed, the vehicle Ve is in the halting state etc. On the other hand, in case the condition to halt the engine 1 is satisfied so that the engine 1 is halted, if at least one of the above-mentioned conditions is eliminated, a restarting control of the engine 1 is judged as being satisfied. Consequently, a control to start the engine 1 is allowed to be carried out. The lockup clutch 4, the forward/backward switching mechanism 5, and the hydraulic control unit 18 controlling the continuously variable transmission 6 are to be described in detail sequentially.

EXAMPLE 1

Figure 1:
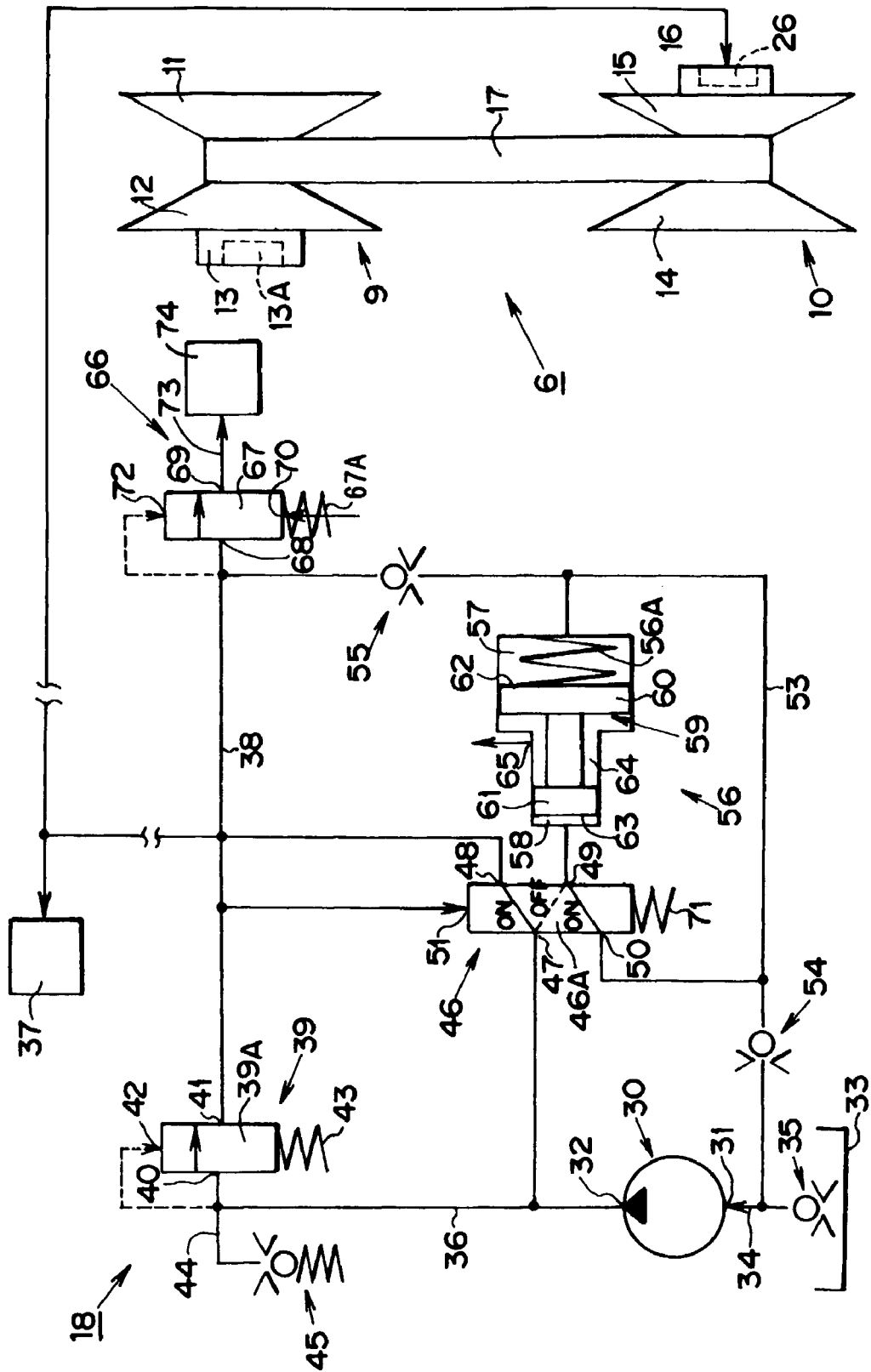
FIG. 1 is a conceptual diagram showing an example 1 of a hydraulic control unit of the invention.

FIG. 1 illustrates an example 1 of the hydraulic control unit 18. The hydraulic control unit 18 has an oil pump 30 driven by the engine 1. The oil pump 30 has a suction inlet 31 and a discharging outlet 32, and an oil passage 34 is formed to connect the suction inlet 31 and an oil pan 33. Also, a check valve 35 is placed on the oil passage 34. The check valve 35 allows oil from the oil pan 33 to flow into the oil passage 34, and prevents the oil in the oil passage 34 from flowing back to the oil pan 33.

On the other hand, the discharging outlet 32 is connected with an oil passage 36. The oil passage 36 is communicated with an oil passage 38 connected with the hydraulic chamber 26, and the hydraulic chamber 37 for the frictional engagement devices of the forward/backward switching mechanism 5. The frictional engagement device includes a brake and a clutch, and a hydraulic chamber is provided to those items individually, however, for the sake of convenience, the hydraulic chamber 37 will be described as a common hydraulic chamber.

On the route from the oil passage 36 to the oil passage 38, there is provided a line-pressure control valve 39 having a spool 39A, an input port 40, an output port 41, a feedback port 42 and an elastic member 43. The input port 40 and the feedback port 42 are connected to the oil passage 36, and the output port 41 is connected to the oil passage 38. The directions of energizing force applied to the spool 39A by the elastic member 43, and energizing force applied to the spool 39A by the oil pressure of the feedback port 42 are opposite to each other. Also, an oil passage 44 diverges from the oil passage 36, and a pressure-relief valve 45 is arranged on the oil passage 44.

Moreover, there is provided a selector valve 46, which is connected with the oil passages 36 and 38. The selector valve 46 has a spool 46A, an input port 47, output ports 48 and 49, a drain port 50, a control port 51, and an elastic member 71. The input port 47 is connected with the oil passage 36, and the output port 48 and the control port 51 are connected with the oil passage 38. The directions of energizing force applied to the spool 46A by the elastic member 71, and energizing force applied to the spool 46A by the oil pressure of the control port 51 are opposite to each other.

Also, there is formed an oil passage 53 connecting the oil passages 34 and 38. A check valve 54 is interposed between the oil passages 34 and 53, and a check valve 55 is interposed between the oil passages 53 and 38. The check valve 54 allows the oil from the oil passage 34 to flow into the oil passage 53, and prevents the oil of the oil passage 53 from flowing back to the oil passage 34. On the other hand, the check valve 55 allows the oil from the oil passage 53 to flow into the oil passage 38, and prevents the oil of the oil passage 38 from flowing back to the oil passage 53.

An accumulator 56 is provided between the oil passage 53 and the output port 49 of the selector valve 46. This accumulator 56 has a piston 59, which is placed between a first hydraulic chamber 57 and a second hydraulic chamber 58, and which is movable in the axial direction. The piston 59 has a structure in which a diametrically large portion 60 and a diametrically small portion 61 are connected integrally through a rod portion. An end face 62 of the diametrically large portion 60 is faced with the first hydraulic chamber 57, and an end face 63 of the diametrically small portion 61 is faced with the second hydraulic chamber 58. In the direction perpendicular to an axial direction of the piston 59, areas of the second hydraulic chamber 58 and the end face 63 are substantially equal, and areas of the first hydraulic chamber 57 and the end face 62 are substantially equal. On the other hand, in the direction perpendicular to the axial direction of the piston 59, the areas of the second hydraulic chamber 58 and the end face 63 are smaller than those of the first hydraulic chamber 57 and the end face 62. The accumulator 56 is equipped with an elastic member 56A so that an energizing force is applied to the piston 59 in the axial direction. Specifically, the force is applied in the direction to narrow the capacity of the second hydraulic chamber 58 by the movement of the piston 59. Additionally, there is formed a drain port 65 communicating with a space 64 positioned between the diametrically large portion 60 and the diametrically small portion 61.

Moreover, there is provided a line-pressure control valve 66 for controlling oil pressure of the oil passage 38. The line-pressure control valve 66 has a spool 67, an input port 68, a drain port 69, a control port 70, a feedback port 72 and an elastic member 67A. The input port 68 and the feedback port 72 are connected with the oil passage 38, and the drain port 69 is connected with an oil-requiring portion 74 through an oil passage 73. The oil-requiring portion 74 can be exemplified by a lubrication line. The directions of energizing force applied to the spool 67 by the oil pressure of the feedback port 72, and energizing forces applied to the spool 67 by pushing force of the elastic member 67A and the oil pressure of the control port 70 are opposite to each other. The line-pressure control valve 66 controls the oil pressure of the oil passage 38, and the oil pressure of the oil passage 38 is controlled according to the energizing force of the oil pressure of the feedback port 72, the energizing force of the elastic member 67A, and the energizing force of a signal oil pressure of the control port 70. Although not shown, there is provided an oil passage for feeding the oil to the hydraulic chamber 13A of the primary pulley 9.

Next, here will be described functions of the hydraulic control unit 18. As described above, in the vehicle Ve, the engine 1 can also be started and halted on the basis of a condition other than the signal of ignition switch, i.e., the stop condition and the restarting condition. The situation where the engine 1 is thus halted and started in accordance with the stop condition and the restarting condition can be exemplified by a situation where the vehicle is waiting for the traffic light to change, or stuck in a traffic congestion. Under such circumstances, the starting performance of the vehicle Ve for the case of restarting the halted engine 1 has to be improved. The hydraulic control unit 18 shown in FIG. 1 is capable of realizing such requirement.

As mentioned above, in case the stop condition is satisfied so that the engine 1 is halted, the oil pump 30 is not driven so that the oil (i.e., the operating oil) is not discharged from the oil pump 30 to the oil passage 36. Consequently, the oil amounts in the hydraulic chambers 26 and 37 are reduced, the frictional engagement devices of the forward/backward switching mechanism 5 are released, and the transmission torque of the belt-type continuously variable transmission 6 is lowered. Then, in case the restarting condition is satisfied so that the engine 1 is started, the oil pump 30 is driven by the power of the engine 1. When the oil pump 30 is driven, the oil in the oil pan 33 is aspirated and discharged to the oil passage 36.

The oil pressure of the oil passage 38 is inputted to the control port 51 of the selector valve 46, and the movement of the selector valve 46 is controlled by the energizing force applied to the spool 46A according to the oil pressure of the control port 51. Specifically, in case the oil pressure of the oil passage 38 is a preset second oil pressure or lower, the input port 47 and the output port 49 are connected, and the output port 48 and the drain port 50 are disconnected. Thus, the condition, in which the input port 47 and the output port 49 are connected, and the output port 48 and the drain port 50 are disconnected, is called "OFF state of the selector valve 46".

In the line pressure control valve 39, on the other hand, the input port 40 and the output port 41 are disconnected in case the oil pressure of the oil passage 36 is a preset first oil pressure or lower. Therefore, the oil will not be discharged from the oil passage 36 to the oil passage 38 through the line pressure control valve 39. In case the oil pressures of the oil passages 36 and 44 are preset third oil pressure or lower, the pressure-relief valve 45 is closed so that the oil will not drain from the oil passage 44. Characteristics of the selector valve 46, the line pressure control valve 39, and the pressure-relief valve 45 are so set as to lower the second oil pressure in comparison with the first oil pressure, and to raise the third oil pressure higher than the first oil pressure.

As mentioned above, in case the oil pressure of the oil passage 38 is the second oil pressure or lower after the startup of the engine 1, the oil is fed from the oil passage 36 to the second hydraulic chamber 58 of the accumulator 56 through the input port 47 of the selector valve 46 and the output port 49. As a result, the oil pressure in the second hydraulic chamber 58 is raised so that the piston 59 is moved to the right side of the FIG. 1. This movement of the piston 59 enlarges the capacity of the second hydraulic chamber 58, and reduces the capacity of the first hydraulic chamber 57. Since the first hydraulic chamber 57 reserves the oil in advance, the oil pressure of the first hydraulic chamber 57 rises with the reduction of its capacity and the oil is discharged to the oil passage 53. In case the oil pressure of the oil passage 53 is higher than that of the oil passage 38, the check valve 55 is opened and the oil is fed from the oil passage 53 to the oil passage 38. Additionally, since the check valve 54 is provided, the oil of the oil passage 53 will not flow back to the oil passage 34.

In case the oil is fed to the oil passage 38 from the first hydraulic chamber 57 so that the oil pressure of the oil passage 38 is raised as described above, and the oil pressure inputted to the control port 51 of the selector valve 46 exceeds the second oil pressure, the input port 47 and the output port 48 are connected, and the output port 49 and the drain port 50 are connected. The condition, in which the input port 47 and the output port 48 are thus connected, and the output port 49 and the drain port 50 are thus connected, is called "ON state of the selector valve 46". For this reason, the oil is fed from the oil passage 36 to the oil passage 38 through the input port 47 of the selector valve 46 and the output port 48. On the other hand, the oil is not fed from the oil passage 38 to the second hydraulic chamber 58, and the oil is discharged from the second hydraulic chamber 58 to the oil passage 53 through the drain port 50. The oil pressure of the second hydraulic chamber 58 is thereby reduced.

Consequently, the piston 59 is moved to the left side in FIG. 1 by the energizing force of the elastic member (i.e., a return spring) 56A, and this movement of the piston 59 reduces the capacity of the second hydraulic chamber 58 and enlarges the capacity of the first hydraulic chamber 57. Thus, in order to prepare to startup the engine 1 after the upcoming cessation, the pressure of the first hydraulic chamber 57 is lowered to negative, the check valve 54 is opened, and the oil of the oil passage 34 is aspirated to the first hydraulic chamber 57 through the oil passage 53. Consequently, the oil is reserved in the first hydraulic chamber 57. Additionally, the check valve 55 prevents the oil of the oil passage 38 from flowing back to the oil passage 53, in case the pressure of the first hydraulic chamber 57 becomes negative.

In case the oil pressure of the oil passage 36 exceeds the first oil pressure, the input port 40 and the output port 41 are connected by the action of the spool 39A of the line-pressure control valve 39. Consequently, the oil is discharged from the oil passage 36 to the oil passage 38, and the pressure rise in the oil passage 36 is thereby suppressed. Thus, the spool 39A is operated by the oil pressure inputted to the feedback port 42, and the flow rate of the oil discharged from the oil passage 36 to the oil passage 38 is regulated by the action of the spool 39A. In other words, the oil pressure of the oil passage 36, i.e., the first line pressure is thus controlled by the control valve 39. In case the oil pressure of the oil passage 36 exceeds the third oil pressure, the pressure-relief valve 45 is opened and the oil is discharged from the oil passage 36 to the oil pan 33 through the pressure-relief valve 45.

The oil pressure of the oil passage 38 is inputted to the feedback port 72, and the input port 68 and the drain port 69 are disconnected, in case the oil pressure of the oil passage 38 is lower than a predetermined fourth oil pressure. In case the oil pressure of the oil passage 38 exceeds the fourth oil pressure, the input port 68 and the drain port 69 are connected by the action of the spool 67, and the oil is fed to the oil requiring portion 74 from the oil passage 38 through the oil passage 73. On the other hand, in case oil pressure of the oil passage 38 drops, the flow rate of the oil discharged from the oil passage 38 to the oil passage 73 is reduced by the action of the spool 67. Thus, the spool 67 is acted by the oil pressure inputted to the feedback port 72, and the oil pressure of the oil passage 38, i.e., the second line pressure is controlled by the line-pressure control valve 66. Additionally, the fourth oil pressure is higher than the second oil pressure, and lower than the first oil pressure.

As described above, the oil fed to the oil passage 38 is then fed to the hydraulic chambers 26 and 37. Consequently, the clamping pressure applied to the belt 17 by the secondary pulley 10, as well as the applying pressure of the forward/backward switching mechanism 5, are increased. For this reason, the transmission torque of the forward/backward switching mechanism 5, and the transmission torque of the continuously variable transmission 6 are increased when the vehicle Ve is started. Also, according to the example 1, in case the oil pressure of the oil passage 38 is lower than the second oil pressure when the halted engine is started, the oil of the oil passage 36 is fed to the second hydraulic chamber 58 of the accumulator 56 through the selector valve 46, and the oil reserved in the first hydraulic chamber 57 by the function of the accumulator 56 is fed to the oil passage 38 through the oil passage 53.

According to the example 1, given that the following condition:

$$PL1 > (PL2\text{FULL} \cdot B1 + We + F)A1 \tag{1}$$

is satisfied, the following equality:

$$Q2 = Q1 \cdot (B1/A1) \tag{2}$$

is satisfied.

Here, in the above formulas (1) and (2): "PL1" represents "the first oil pressure"; "PL2FULL" represents "the second oil pressure"; "B1" represents "the area of the end face 62"; "A1" represents "the area of the end face 63"; "Q2" represents "the amount of the oil fed to the oil passage 38 from the first hydraulic chamber 57"; and "Q1" represents "the amount of the oil fed to the second hydraulic chamber 58". Pressure level of the second oil pressure is a level which is possible to judge that "the oil passage 38 is filled with the operating oil". A load applied to the end face 62 by the elastic member 56A varies within the range from Ws to We. Here, Ws is a minimum load of the case in which the elastic member 56A stretches to the end, and We is a maximum load of the case in which the elastic member 56A is compressed. Also, "F" represents a friction resistance of the case in which the piston 59 makes a move.

Thus, according to the example 1, in the early phase of the case of feeding the oil discharged from the oil pump 30 to the oil passage 38, the flow rate of the oil fed to the hydraulic chambers 26 and 37 from the first hydraulic chamber 57 through the oil passage 38 is larger than the flow rate of the oil fed to the second hydraulic chamber 58, so that the oil can be fed efficiently to the oil passage 38 as well as the hydraulic chambers 26 and 37. For this reason, it is possible to improve a response of the pressure rise in the oil passage 38 and the hydraulic chambers 26 and 37, as well as in a reliability of the hydraulic control unit 18. Therefore, a response of the control of the transmission torques of the forward/backward switching mechanism 5 and the continuously variable transmission 6 is improved; occurring of slippage can be prevented in the frictional engagement device of the forward/backward switching mechanism 5 as well as in the continuously variable transmission 6; and a starting performance of the vehicle Ve is improved.

Also, since the discharging capacity of the oil pump 30 is not necessary to be increased, it is possible to avoid degradation in fuel consumption of the engine 1 which drives the oil pump 30. Moreover, feeding efficiency of the oil fed to the oil passage 38 as well as the hydraulic chambers 26 and 37 can be improved by feeding the oil discharged from the oil pump 30 driven by the engine 1 to the second hydraulic chamber 58. For this reason, an additional oil pump (e.g., an electric oil pump) is not required other than the oil pump 30 driven by the engine 1, so that the rise in the number of parts can be curbed.

In case the selector valve 46 is controlled to ON state, the oil in the second hydraulic chamber 58 is aspirated to the first hydraulic chamber 57 through the oil passage 53. Therefore, the feeding amount of the oil from the oil pan 33 to the hydraulic chamber 57 can be reduced, and a traveling distance of the aspirated oil to the first hydraulic chamber 57 can also be reduced as short as possible. Accordingly, response of the accumulator 56 is improved and this facilitates the second hydraulic chamber 58 to lower the oil pressure. As a result of this, the load applied to the piston 59 can be reduced by reducing the constant of the elastic member 56A. Moreover, since the traveling distance of the oil aspirated to the first hydraulic chamber 57 is short, the deterioration in the aspirating performance can be avoided even when the viscosity of the oil is high at a low temperature. Furthermore, since the accumulator 56 does not have a function to keep the pressure higher than a preset value while the oil is being retained in the first hydraulic chamber 57 by the negative pressure, an oil leak or the like can be avoided.

Here will be described the corresponding relations between the constructions of FIGS. 1 and 2, and the construction of the invention. The engine 1 corresponds to the prime mover of the invention; the forward/backward switching mechanism 5 and the belt-type continuously variable transmission 6 correspond to the power transmission system of the invention; the belt-type continuously variable transmission 6 corresponds to the continuously variable transmission of the invention; the transmission torque and the applying pressure of the frictional engagement devices of the forward/backward switching mechanism 5, and the oil pressure and the transmission torque of the hydraulic chamber 26 of the belt-type continuously variable transmission 6 correspond to "the power transmission state" of the invention; the oil pressure and the feeding amount of the operating oil of the oil passage 38 and the hydraulic chambers 26 and 37 correspond to "the oil feeding sate" of the invention; the oil passage 38 and the hydraulic chambers 26 and 37 correspond to the oil receiving device of the invention; the accumulator 56 corresponds to the oil reserving device of the invention; the end face 62A corresponds to the first pressure-receiving face of the invention; the end face 63 corresponds to the second pressure-receiving face of the invention; and the selector valve 46 corresponds to the oil feeding amount controlling device of the invention.

EXAMPLE 2

Figure 3:
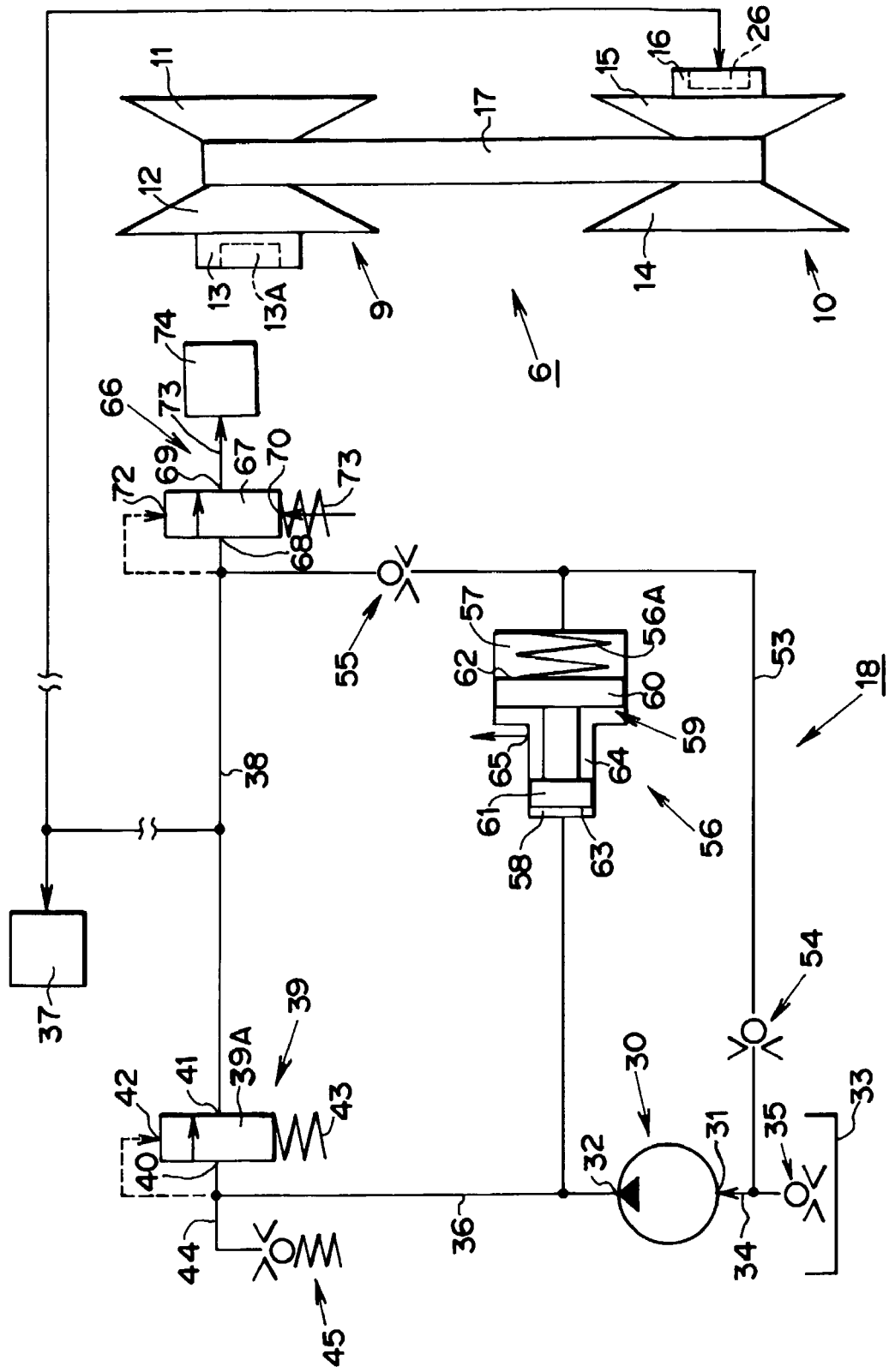
FIG. 3 is a conceptual diagram showing an example 2 of the hydraulic control unit of the invention.

Example 2 of the aforementioned hydraulic control unit 18 will be described hereinafter with reference to FIG. 3. In the example 2, the oil passage 36 and the second hydraulic chamber 58 of the accumulator 56 are connected directly with each other, and the aforementioned selector valve 46 is not provided. The remaining construction of example 2 is identical to that of the example 1. According to the example 2, when the engine 1 is started, the oil discharged from the oil pump 30 is fed to the second hydraulic chamber 58 of the accumulator 56 through the oil passage 36. Then, the oil in the first hydraulic chamber 57 is fed to the oil passage 38 through the oil passage 53 on the same principle as the example 1. The line-pressure control valve 39 feeds the oil of the oil passage 36 to the oil passage 38 through the input port 40 and the drain port 41, before the oil of the first hydraulic chamber 57 is completely fed to the oil passage 38.

Also, according to the example 2, the oil is kept fed from the oil passage 36 to the second hydraulic chamber 58 while the engine 1 is driven. Therefore, the piston 59 stays at a predetermined position, i.e., the right side of its moving direction in FIG. 3. When the engine 1 is halted so that the oil is not discharged from the oil pump 30 to the oil passage 36, and the pressure of the second hydraulic chamber 58 drops, the piston 59 is moved to the left side in FIG. 3 by the load applied by the elastic member 56A. As a result, the pressure of the first hydraulic chamber becomes negative and the oil in the oil passage 34 is aspirated to the first hydraulic chamber 57 through the oil passage 53. The action attained by the example 1 can also be attained by the construction of the example 2 in common with that of the example 1. In this example 2, the oil passage 36 corresponds to the oil feeding amount controlling device of the invention; the hydraulic chamber 13A corresponds to an hydraulic chamber of the primary pulley; and the hydraulic chamber 26 corresponds to an hydraulic chamber of the secondary pulley. The corresponding relations between the remaining construction of the example 2 and the invention are identical to that between the example 1 and the invention.

EXAMPLE 3

Figure 4:
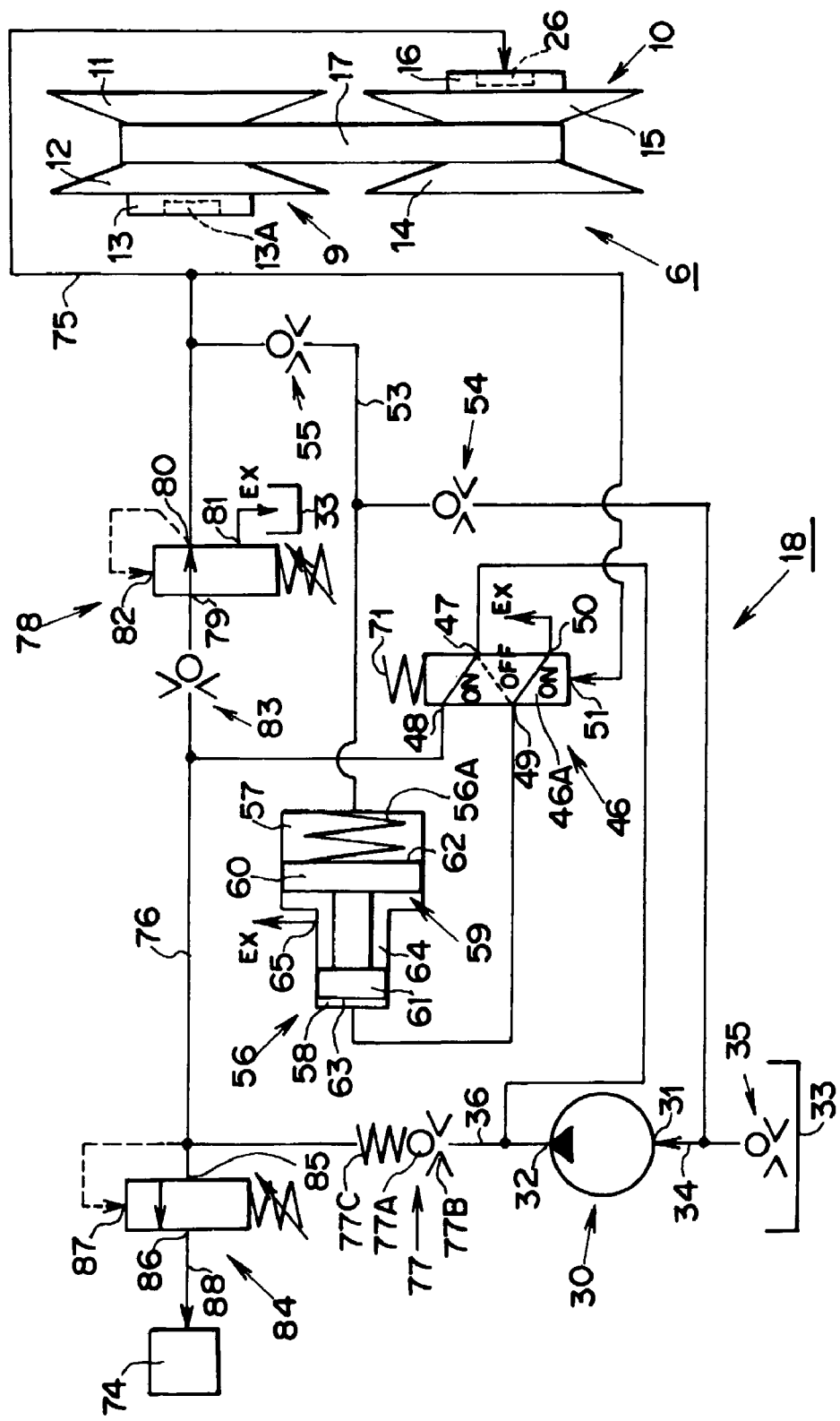
FIG. 4 is a conceptual diagram showing an example 3 of the hydraulic control unit of the invention.

Next, an example 3 of the hydraulic control unit 18 will be described with reference to FIG. 4. According to the example 3, there is provided an oil passage 75 connected with the hydraulic chamber 26, and the oil pressure of the oil passage 75 is inputted to the control port 51 of the selector valve 46. Also, the oil passage 75 and the oil passage 53 are connected with each other, and the check valve 55 is interposed therebetween. The check valve 55 allows the oil from the oil passage 53 to flow into the oil passage 75, and prevents oil of the oil passage 75 from flowing back to the oil passage 53.

On the other hand, there is formed an oil passage 76 connected with the oil passage 36, and a line pressure control valve 77 is arranged between the oil passages 36 and 76. The line pressure control valve 77 comprises a relief valve, and equipped with a valve element 77A, and an elastic member 77C for pressing the valve element 77A against a valve seat 77B. The line pressure control valve 77 has a function to control the oil pressure of the oil passage 36. Between the oil passages 76 and 75, there is provided a secondary sheave pressure control valve 78. The secondary sheave pressure control valve 78 has an input port 79, an output port 80, a drain port 81, and a feedback port 82. The input port 79 is connected with the oil passage 76, the output port 80 and the feedback port 82 are connected with the oil passage 75, and the drain port 81 is connected with an oil pan 33. A check valve 83 is also arranged between the oil passage 76 and the input port 79. The check valve 83 allows the oil of the oil passage 76 to be fed to the input port 79, and prevents the oil of the input port 79 from flowing back to the oil passage 76.

Moreover, a line pressure control valve 84 is connected with the oil passage 76. The line pressure control valve 84 has an input port 85, a drain port 86, and a feedback port 87. The input port 85 and the feedback port 87 are connected with the oil passage 76, and an oil requiring portion 74 is connected with the drain port 86 through an oil passage 88. Here, the remaining construction in FIG. 4 is identical to that in FIG. 1.

According to the example 3, the oil pressure of the oil passage 75 is inputted to the control port 51 of the selector valve 46, and action of the selector valve 46 is switched according to the pressure of the oil passage 75. As mentioned above, when the engine 1 is halted, the oil pump 30 comes to a halt so that the feeding amount of the oil to the oil passage 75 and the hydraulic chamber 26 is reduced. Consequently, the oil pressures of the oil passage 75 and the hydraulic chamber 26 are lowered. In case the oil pressure of the oil passage 75 is thus lowered and the oil pressure inputted to the control port 51 is low, the selector valve is turned into OFF state.

Subsequently, in case the restarting condition of the engine 1 is satisfied so that the halted engine 1 is driven, the oil pump 30 is driven and the oil is discharged from the oil pump 30 to the oil passage 36. As the example 1, a part of the oil discharged to the oil passage 36 is fed to the second hydraulic chamber 58. The oil is discharged from the first hydraulic chamber 57 to the oil passage 53 on the same principle as the example 1, and then fed to the oil passage 75 and the hydraulic chamber 26. In case the oil pressure of the oil passage 75 exceeds a predetermined fifth oil pressure, the oil pressure inputted to the control port 51 rises so that the selector valve 46 is turned into ON state. Consequently, the oil of the oil passage 36 is fed to the oil passage 76 through the input port 47 and the drain port 48.

On the other hand, in case the oil pressure of the oil passage 75 is lower than a sixth oil pressure, the input port 79 and the output port 80 are connected, and the drain port 81 is shut off in the secondary sheave pressure control valve 78. Here, the sixth oil pressure is higher than the fifth oil pressure. Therefore, the oil of the oil passage 76 is fed to the oil passage 75 through the secondary sheave pressure control valve 78. Also, when the selector valve 46 is turned into ON state, the second hydraulic chamber 58 is connected with the oil pan 33 so that the pressure of the second hydraulic chamber 58 drops, and the piston 59 is moved to the left side in FIG. 4 by the energizing force of the elastic member 56A. As a result, the oil is discharged from the second hydraulic chamber 58 to the oil pan 33 through the selector valve 46. In consequence of this action of the piston 59, the oil is aspirated to the first hydraulic chamber 57 on the same principle as the example 1.

Thus, the oil discharged from the oil pump 30 is fed to the oil passage 75 through the oil passages 36 and 76, and the secondary sheave pressure control valve 78. In case the oil pressure of the oil passage 75 exceeds the sixth oil pressure, the output port 80 and the drain port 81 are connected, and the input port 79 is shut off. As a result, the oil in the oil passage 75 is discharged to the oil pan 33 through the drain port 81, and the oil pressure of the oil passage 75 is prevented from rising or lowered. On the contrary, in case the oil pressure of the oil passage 75 becomes lower than the sixth oil pressure, the input port 79 and the output port 80 are connected again, and the drain port 81 is shut off. The oil is thereby fed from the oil passage 76 to the oil passage 75. Thus, the oil of the oil passage 75 is controlled by the secondary sheave pressure control valve 78.

In case the oil pressure of the oil passage 36 is lower than a seventh oil pressure during the above-mentioned operation, the line pressure control valve 77 is closed. On the contrary, in case the oil pressure of the oil passage 36 exceeds the seventh oil pressure, the line pressure control valve 77 is opened and the oil is discharged from the oil passage 36 to the oil passage 76 through the line pressure control valve 77. In case the oil pressure of the oil passage 76 is lower than an eighth oil pressure, the input port 85 of the line pressure control valve 84 and the drain port 86 are disconnected. In case the oil pressure of the oil passage 76 exceeds the eighth oil pressure, the input port 85 and the drain port 86 are connected, and the oil is fed from the oil passage 76 to the oil requiring portion 74 through the oil passage 88.

In this example 3, given that the following condition:

$$PL1 > (PsecFULL \cdot B1 + We + F)A1 \qquad (3)$$

is satisfied, the above-mentioned formula (2) is satisfied. In the above formula (3), "PsecFULL" represents "the oil pressure of the oil passage 75". The action similar to the example 1 can also be attained by the construction of the example 3 in common with the example 1. Here will be described the corresponding relation between the example 3 and the invention. The oil passage 75 and the hydraulic chamber 26 correspond to the oil receiving device of the invention. The corresponding relations between the remaining construction of the example 3 and the invention are identical to that between the example 1 and the invention.

EXAMPLE 4

Next, an example 4 of the hydraulic control unit 18 will be described with reference to FIG. 5. The construction of the hydraulic control unit 18 according to the example 4 is almost identical to that of the example 3. Therefore, only the differences in comparison with the hydraulic control unit 18 of the example 3 will be explained. According to the example 4, the drain port 50 of the selector valve 46 is connected with the oil passage 53. A connecting point of the oil passage 53 and the drain port 50 is located between the check valves 54 and 55. A line pressure control valve 100 is provided on the route from the oil passage 36 to the oil passage 76. The line pressure control valve 100 has an input port 101, a drain port 102, and a feedback port 103. The input port 101 and the feedback port 103 are connected with the oil passage 36, and the drain port 102 is connected with the oil passage 76.

A pressure-relief valve 500 is provided on the oil passage 36 between the oil pump 30 and the line pressure control valve 100. The pressure-relief valve 500 has a valve element 502, and an elastic member 503 for pressing the valve element 502 against a valve seat 501. The oil drains from the oil passage 36 when the pressure-relief valve 500 is opened.

Figure 5:
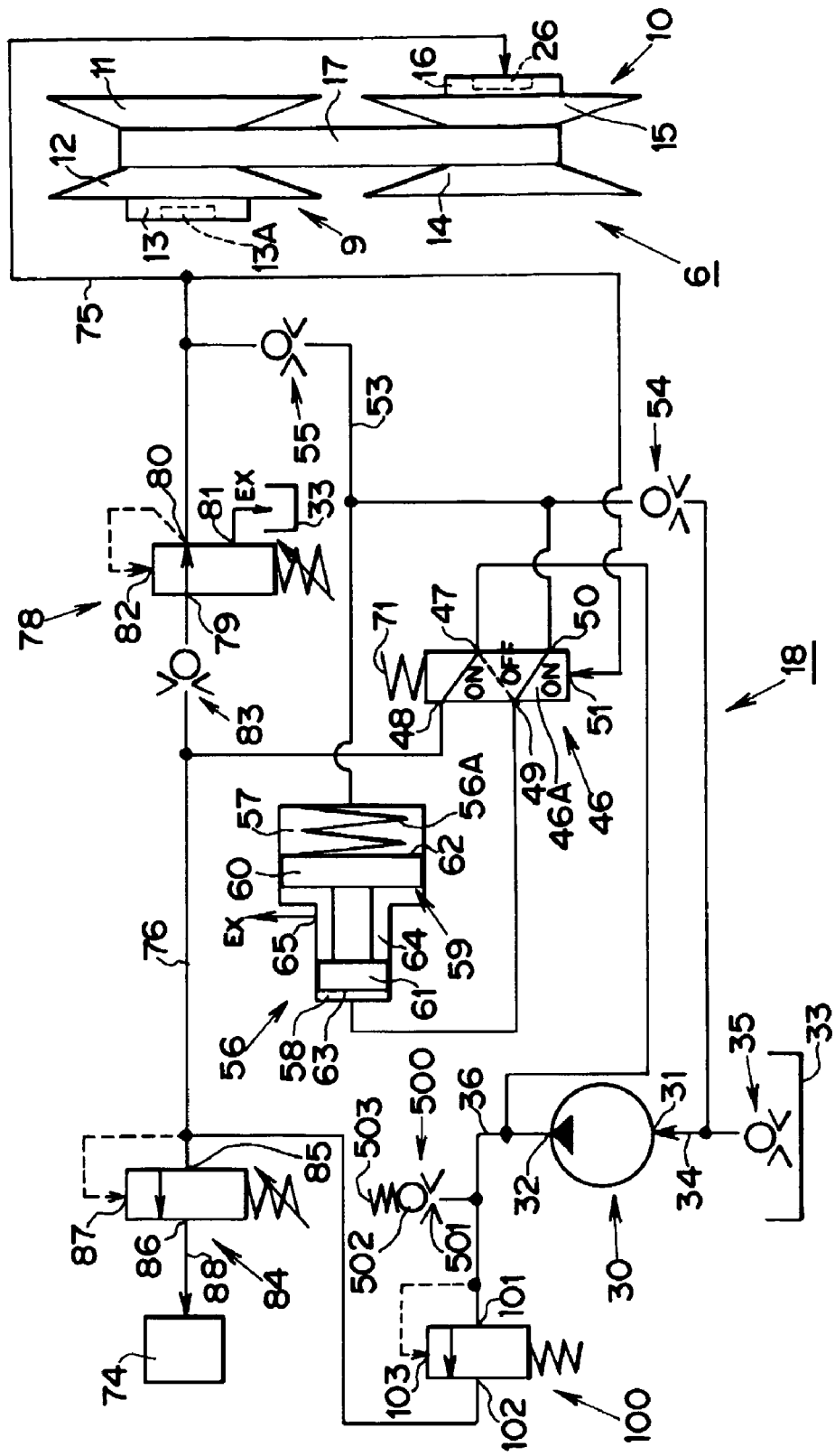
FIG. 5 is a conceptual diagram showing an example 4 of the hydraulic control unit of the invention.

According to the example 4, in case the selector valve 46 is turned into ON state and the piston 59 moves to the left side of FIG. 5, the oil is fed from the second hydraulic chamber 58 to the oil passage 53 through the selector valve 46, and then the oil is aspirated to the first hydraulic chamber 57. Therefore, the amount of the oil aspirated from the oil pan 33 to the first hydraulic chamber 57 can be reduced, and the traveling distance of the aspirated oil can be shortened. Consequently, same effect as that of the example 1 can be attained. In case the oil pressure of the oil passage 36 reaches the predetermined pressure, that is, in case the oil pressure of the oil passage 36 exceed an opening pressure of the line pressure control valve 100, the input port 101 and the drain port 102 are communicated with each other so that the oil is discharged from the oil passage 36 to the oil passage 76. Pressure rise of the oil passage 36 is thereby suppressed. In case the oil pressure of the oil passage 36 drops, the input port 101 and the drain port 102 are disconnected so that the oil is not discharged from the oil passage 36 to the oil passage 76. Thus, the oil pressure of the oil passage 36 is controlled by the line pressure control valve 100.

An opening pressure of the pressure-relief valve 500 is set higher than that of the line pressure control valve 100. In case the line pressure control valve 100 fails when it is opening, the oil is not discharged from the oil passage 36 to the drain port 102 even if the oil pressure of the oil passage 36 exceeds the opening pressure of the line pressure control valve 100. Therefore, in case the oil pressure of the oil passage 36 further rises and exceeds the opening pressure of the pressure-relief valve 500, the pressure-relief valve 500 is opened so that the oil drains from the oil passage 36. As a result, the oil pressure of the oil passage 36 is prevented from further rising. Besides, the pressure-relief valve 500 may not be provided to the hydraulic control unit 18 of FIG. 5. The remaining effects of the example 4 are identical to those of the examples 1 to 3.

Here will be described the corresponding relations between the construction of the example 4 and the invention. The selector valve 46 corresponds to the oil feeding amount control device of the invention. The corresponding relations between the remaining construction of the example 4 and the invention are identical to that between the example 1 and the invention.

EXAMPLE 5

Figure 6:
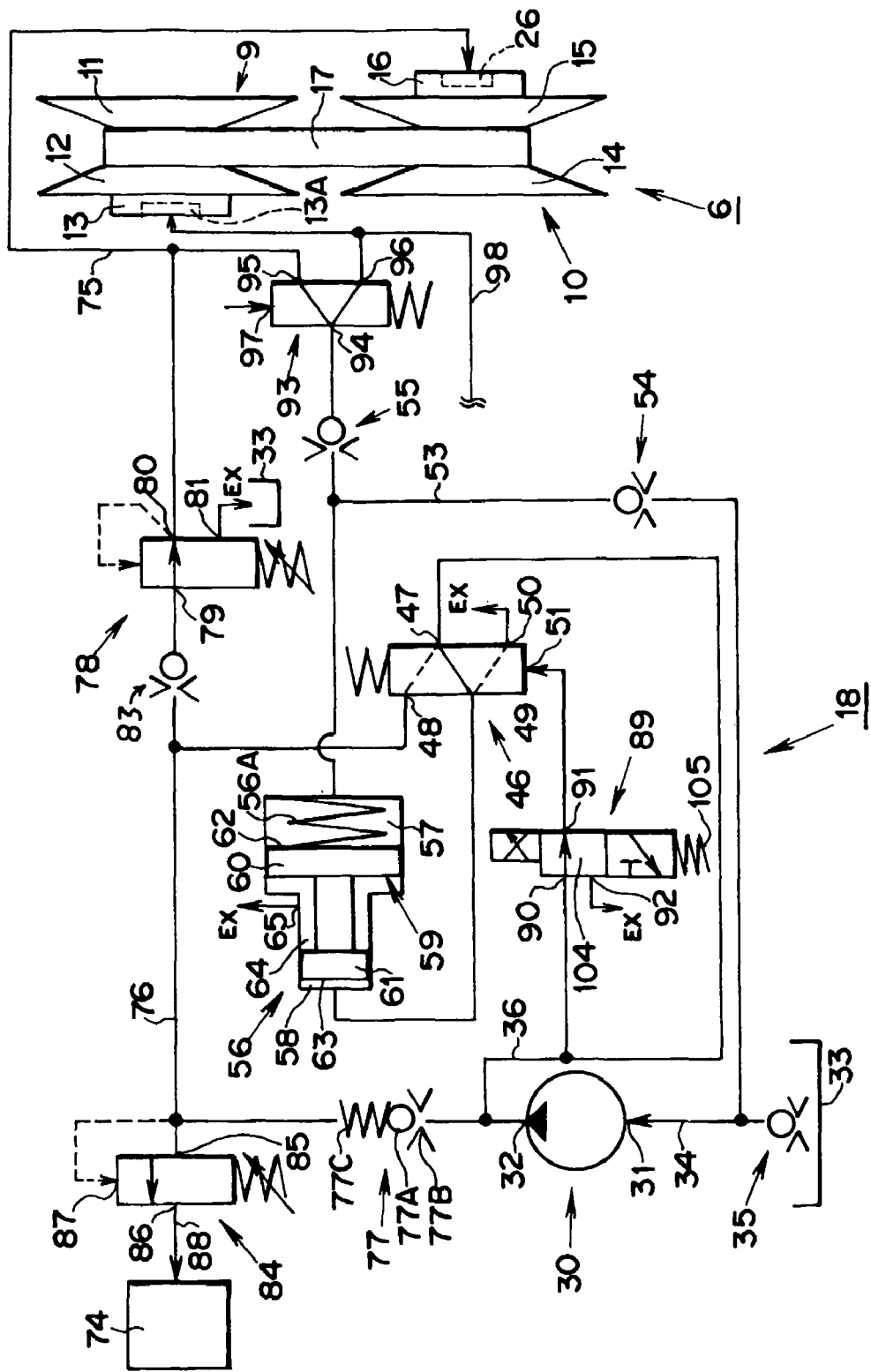
FIG. 6 is a conceptual diagram showing an example 5 of the hydraulic control unit of the invention.

Next, an example 5 of the hydraulic control unit 18 will be described with reference to FIG. 6. The construction of the example 5 is almost identical to that of the example 4. Therefore, only the differences in comparison with the example 4 will be explained. According to the example 5, there is provided a solenoid valve 89 between the control port 51 of the selector valve 46 and the oil passage 36. The solenoid valve 89 has a spool 104 which is energized by magnetic attraction force in the predetermined direction, an elastic member 105 energizing the spool 104 in the direction opposite to that of the magnetic attraction force, an input port 90, an output port 91, and a drain port 92. The input port 90 is connected with the oil passage 36, the output port 91 is connected with the control port 51, and the drain port 92 is connected with the oil pan 33.

On the other hand, a selector valve 93 is arranged downstream of an oil discharging direction of the check valve 55. The selector valve 93 has an input port 94, output ports 95 and 96, and a control port 97. Any one of the output ports 95 and 96 is connected with the input port 94 according to a level of a signal pressure inputted to the control port 97. The output port 95 is connected with the oil passage 75, and output port 96 is connected with the hydraulic chamber 13A through the oil passage 98. The remaining construction of the example 5 is identical to that of the example 4.

According to the hydraulic control unit 18 of the example 5, when the engine 1 is halted, the solenoid valve 89 is controlled to connect the output port 91 and the drain port 92, and to shutoff the input port 90. Therefore, the oil in the control port 51 of the selector valve 46 is discharged from the drain port 92, so that the oil pressure of the control port 51 is lowered. Consequently, the selector valve 46 is turned into ON state so that the oil in the second hydraulic chamber 58 is discharged from the drain port 50, and the oil is aspirated to the first hydraulic chamber 57 on the principle as mentioned above.

Then, in case the restarting condition is satisfied so that the halted engine is started, the solenoid valve 89 is controlled to connect the input port 90 and the output port 91, and to shut off the drain port 92. As a result, the oil discharged from the oil pump 30 is fed to the control port 51 through the oil passage 36, the input port 90, and the output port 91, so that the oil pressure of the control port 51 is raised. When the oil pressure of the control port 51 is raised so that the selector valve 46 is turned into OFF state, the oil is fed from the first hydraulic chamber 57 to the selector valve 93 through the oil passage 53 on the same principle as the example 4. At the starting time of the engine 1, the selector valve 93 is controlled to connect the input port 94 and the output port 95, and to shut off the output port 96. For this reason, the oil fed to the selector valve 93 is then fed to the hydraulic chamber 26 through the oil passage 75, and the oil pressure of the hydraulic chamber 26 is thereby raised. Additionally, the oil fed to the oil passage 98 without passing through the selector valve 93 is fed to the hydraulic chamber 13A.

In case the oil is thus fed to the oil passage 75 so that the oil pressure of the oil passage 75 exceeds the predetermined pressure, the solenoid valve 89 is controlled to shut off the input port 90, and to connect the output port 91 and the drain port 92. Consequently, the oil pressure of the control port 51 drops so that the selector valve 46 is turned into ON state, and the oil is fed from the oil passage 36 to the oil passage 76 through the input port 47 and the drain port 48. The action attained by the examples 1 and 4 can also be attained by the construction of the example 5 in common with those of the examples 1 and 4.

Moreover, according to the example 5, it is also possible to carry out the following control. The selector valve 46 is in ON state after the engine 1 is driven as described above. Also, the output port 91 and the drain port 92 are connected and the input port 90 is shut off in the solenoid valve 89 so that the oil pressure of the control port 51 is low. Under such situation, in case a condition to change the speed change ratio of the belt-type continuously variable transmission 6 drastically is satisfied, it is possible to carry out a control to discharge the oil from the first hydraulic chamber 57 to the oil passage 53, by turning the selector valve 46 into OFF state from ON state to move the piston 59 of the accumulator 56 to the right side of FIG. 6.

In case a downshift condition to increase the speed change ratio of the belt-type continuously variable transmission 6 is being satisfied, the selector valve 93 is controlled to connect the input port 94 and the output port 95, and to shut off the output port 96. Therefore, the oil is fed from the oil passage 53 to the hydraulic chamber 26 through the oil passage 75. On the contrary, in case an upshift condition to reduce the speed change ratio of the belt-type continuously variable transmission 6 is being satisfied, the selector valve 93 is controlled to connect the input port 94 and the output port 96, and to shut off the output port 95. Therefore, the oil is fed from the oil passage 53 to the hydraulic chamber 13A through the oil passage 98. Here, when the discharge of the oil from the first hydraulic chamber 57 is finished, the selector valve 46 is turned into ON state in any of up shifting and down shifting cases. Thus, it is possible to improve the response of the belt-type continuously variable transmission 6 to change the speed change ratio, and to improve the response of the clamping pressure applied to the belt 17 by the secondary pulley 10.

Here will be described the corresponding relations between the constructions of the example 5 and the invention.

The oil passage 38 and the hydraulic chambers 13A, 26 and 37 correspond to the oil receiving device of the invention, and the selector valve 46 and the solenoid valve 89 correspond to the oil feeding amount controlling device of the invention. The corresponding relation between the remaining constructions of the example 5 and the invention is identical to that between the example 1 and the invention.

EXAMPLE 6

Figure 7:
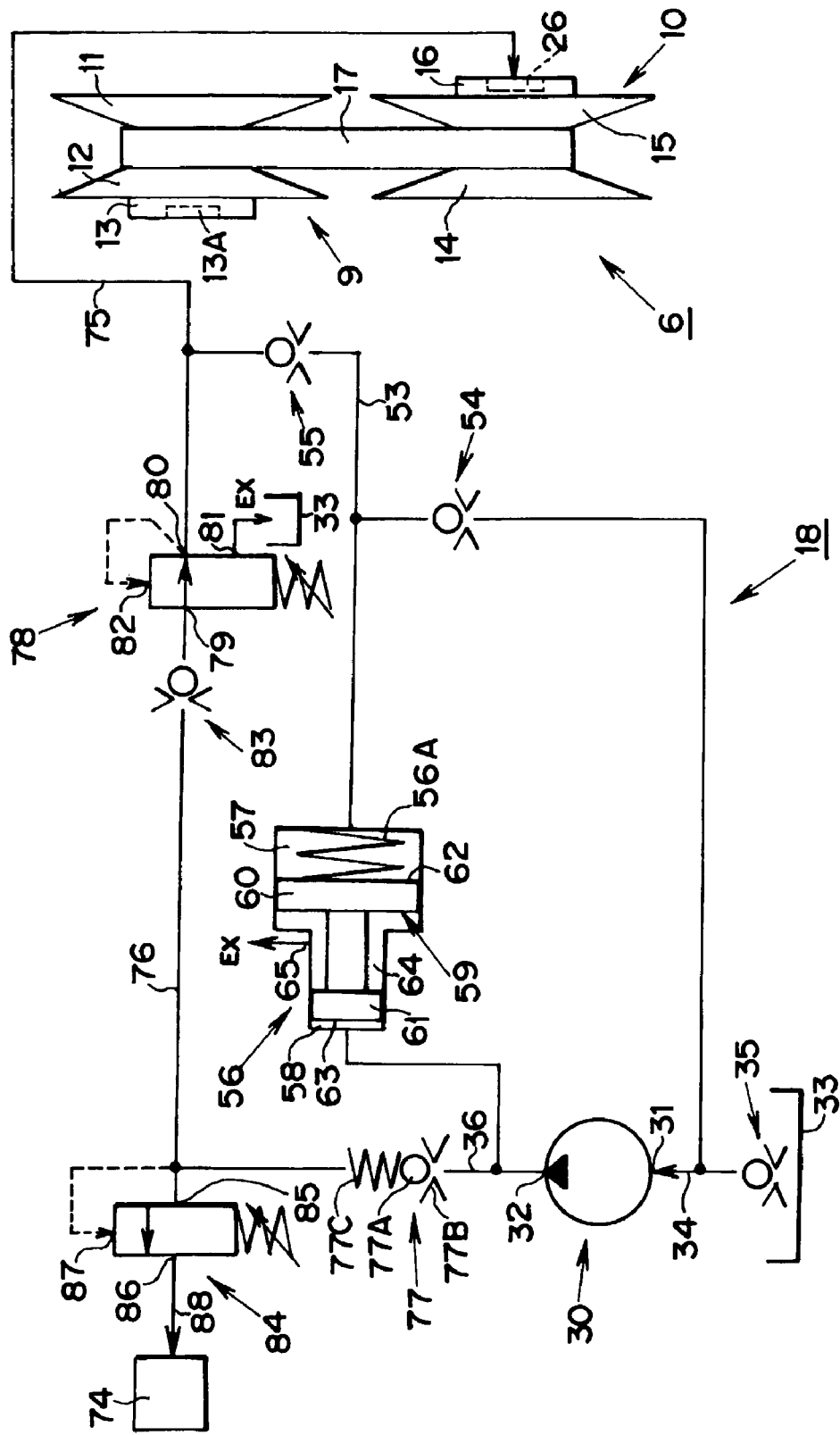
FIG. 7 is a conceptual diagram showing an example 6 of the hydraulic control unit of the invention.

Next, an example 6 of the hydraulic control unit 18 will be described with reference to FIG. 7. The example 6 resembles the example 3, but the selector valve 46 of the hydraulic control unit 18 of the example 3 is not provided to the hydraulic control unit 18 of the example 6. Specifically, the oil passage 36 is connected directly with the second hydraulic chamber 58. The remaining construction of the example 6 is identical to that of the example 3.

According to the example 6, when the engine 1 is started, the oil discharged from the oil pump 30 is fed to the second hydraulic chamber 58 of the accumulator 56 through the oil passage 36. Then, the oil in the first hydraulic chamber 57 is fed to the oil passage 75 through the oil passage 53 on the same principle as the example 1. Also, since the piston 59 moves to the right side in FIG. 7, the line pressure control valve is closed in case the oil pressure of the oil passage 36 is lower than the predetermined pressure.

In case the oil pressure of the oil passage 36 exceeds the predetermined pressure prior to feed the oil of the first hydraulic chamber 57 to the oil passage 38 completely, the line pressure control valve 77 is opened and the oil is fed from the oil passage 36 to the oil passage 76 through the line pressure control valve 77. The oil of the oil passage 76 is fed to the hydraulic chamber 26 on the same principle as the example 3.

According to the example 6, moreover, the oil is kept fed from the oil passage 36 to the second hydraulic chamber 58 while the engine 1 is being driven. Therefore, the piston 59 stops at the right side in FIG. 7. Then, when the engine 1 is halted so that the oil is not discharged from the oil pump 30 to the oil passage 36 and the oil pressure of the second hydraulic chamber drops, the oil of the oil passage 34 is aspirated to the first hydraulic chamber 57, as mentioned in the example 2. The action attained by the examples 1 and 3 can also be attained by the construction of the example 6 in common with that of the examples 1 and 3. In the example 6, the oil passage 36 corresponds to the oil feeding amount control device of the invention. The corresponding relations between the remaining construction of the example 6 and the invention are identical to that between the example 1 and the invention.

EXAMPLE 7

Figure 8:
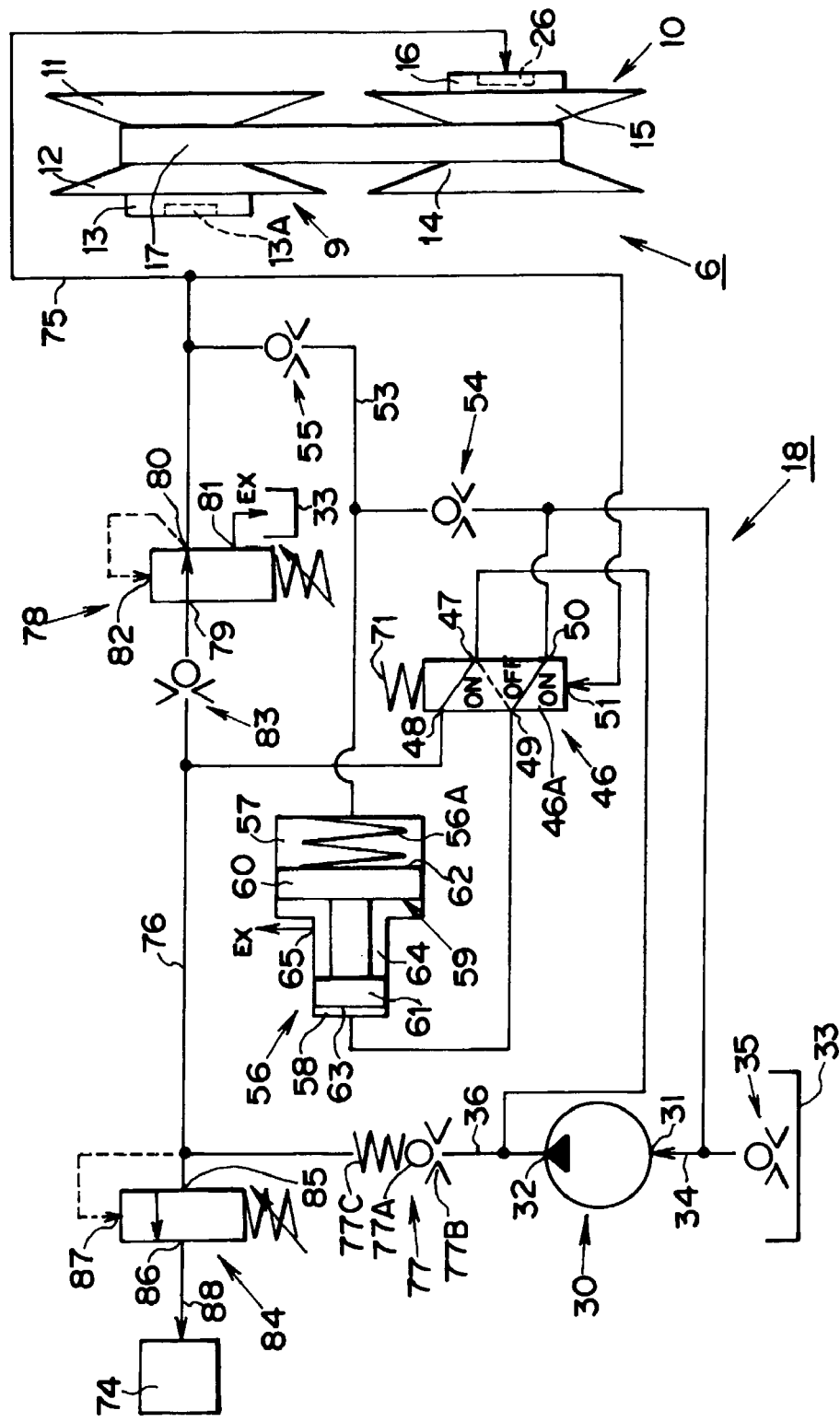
FIG. 8 is a conceptual diagram showing an example 7 of the hydraulic control unit of the invention.

Next, an example 7 of the hydraulic control unit 18 will be described with reference to FIG. 8. The example 7 resembles the example 4, but in the hydraulic control unit 18 of the example 7, a line pressure control valve 77 is employed in place of the line pressure control valve 100. The remaining construction of the example 7 is identical to that of the example 4. According to the example 7, in case the oil pressure of the oil passage 36 is low, the line pressure control valve 77 is closed. On the other hand, in case the selector valve 46 is controlled to ON state and the oil pressure of the oil passage 36 exceeds the predetermined pressure, the line pressure control valve 77 is opened and the oil is discharged from the oil passage 36 to the oil passage 76. The remaining effects attained by the hydraulic control unit 18 of the example 7 are identical to those of the hydraulic control unit 18 of the example 4. Here, the corresponding relation between the constructions explained in the example 7 and the invention are identical to those between the constructions of the example 4 and the invention.

EXAMPLE 8

Figure 9:
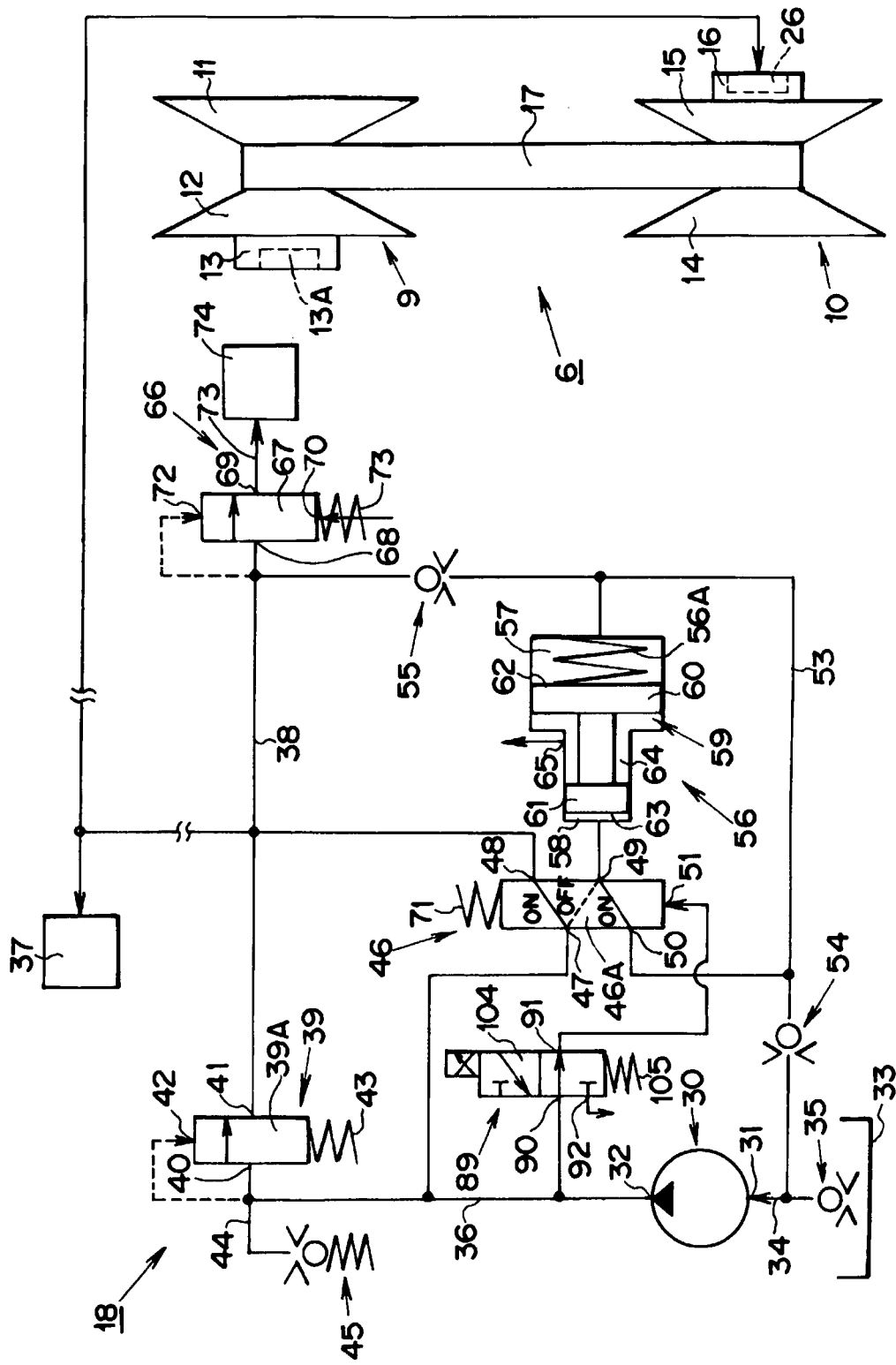
FIG. 9 is a conceptual diagram showing an example 8 of the hydraulic control unit of the invention.

Next, an example 8 of the hydraulic control unit 18 will be described with reference to FIG. 9. The construction of the hydraulic control unit 18 illustrated in FIG. 9 is basically identical to the construction of the hydraulic control unit 18 illustrated in FIG. 1. The difference between the hydraulic control units 18 illustrated in FIGS. 1 and 9 is that the directions of the energizing force applied to the spool 46A of the selector valve 46 by the elastic member 71 are opposite to each other. Also, the directions of the energizing force applied to the spool 46A of the selector valve 46 by the control port 51 are opposite to each other in FIGS. 1 and 9.

According to the hydraulic control unit 18 illustrated in FIG. 9, the solenoid valve 89 is provided on the route from the oil passage 36 to the control port 51. The solenoid valve 89 is movable substantially linearly, and equipped with the spool 104 which is energized by magnetic attraction force in the predetermined direction, the elastic member 105 energizing the spool 104 in the direction opposite to that of the magnetic attraction force, the input port 90, the output port 91, and the drain port 92. The input port 90 is connected with the oil passage 36, the output port 91 is connected with the control port 51, and the drain port 92 is connected with the oil pan 33. The solenoid valve 89 is a normal open type solenoid valve, in which the input port 90 and the output port 91 are connected when applying current, and interrupted when the current is not applied.

Next, here will be explained functions of the hydraulic control unit 18 illustrated in FIG. 9. The oil pump 30 is halted when the engine 1 is halted, so that the oil is not discharged to the oil passage 36. Then, when the restarting condition is satisfied so that the engine 1 is started, the oil pump 30 is driven and the oil is discharged to the oil passage 36. On the other hand, in case the oil pressure of the oil passage 38 is lower than the predetermined pressure, no current is applied to the solenoid valve 89. Therefore, the oil is not inputted from the oil passage 36 to the control port 51 so that the oil pressure of the control port 51 is the minimum pressure. Consequently, the selector valve 46 is turned into OFF state, and the part of the oil of the oil passage 36 is fed to the second hydraulic chamber 58 of the accumulator 56 through the input port 47 and the output port 49. As a result, the oil is fed from the first hydraulic chamber 57 to the hydraulic chambers 26 and 37 through the oil passage 38 on the same principle as explained in the example 1.

In case the oil is fed to the oil passage 38 and the oil pressure of the oil passage 38 exceeds the predetermined pressure, as described above, the current is applied to the solenoid valve 89. Then, the oil is fed from the oil passage 36 to the control port 51 so that the oil pressure of the control port 51 is raised. As a result, the selector valve 46 is turned into ON state, and the oil is fed from the oil passage 36 to the oil passage 38 and the hydraulic chambers 26 and 37 through the input port 47 and the drain port 48. Also, the oil pressure of the second hydraulic chamber 58 drops so that the piston 59 is moved to the left side in FIG. 9. Consequently, the oil is discharged from the second hydraulic chamber 58 to the oil passage 53, and the oil is aspirated to the first hydraulic chamber 57 on the same principle as the example 1.

As described above, the same effect as the example 1 can also be attained by the example 8 in case of starting the halted engine. Moreover, the control explained in the example 5 can also be carried out in the example 8. Specifically, it is also possible to feed the oil from the hydraulic chamber 57 to the oil passage 38, by controlling the solenoid valve 89 to turn the selector valve 46 from ON state to OFF state, in case a condition to drastically change the speed change ratio of the belt-type continuously variable transmission 6 is satisfied after the engine 1 is driven, or in case the condition to increase the applying pressure of the frictional engagement devices of the forward/backward switching mechanism 5 is satisfied. The same effect explained in the example 5 can be attained as a result of carrying out this kind of control. Here, the same effect as the example 1 can also be attained by the remaining construction of the example 8.

In the example 8, the control characteristics of the line pressure control valve 39 to control the oil pressure of the oil passage 36 is controlled to satisfy the following inequality:

$$PL1 > (PL2 \cdot B1 + We + F)/A1 \qquad (4).$$

Consequently, the formula (2) described in the example 1 is satisfied. Here, PL1 represents the oil pressure of the oil passage 36, and PL2 represents the oil pressure of the oil passage 38.

Moreover, in the example 8, the solenoid valve 89 is a normal open type solenoid valve. Therefore, upon occurrence of a fail in that the current cannot be applied to the solenoid valve 89, e.g., in case a breaking of wire occurs, the input port 90 and the output port 91 are connected. In this situation, when the restating condition is satisfied so that the halted engine 1 is driven, the oil pump 30 is driven and the oil is discharged to the oil passage 36. The oil in the oil passage 36 is fed to the control port 51; however, the selector valve 46 is in OFF state if the oil pressure of the control port 51 is lower than the predetermined pressure. For this reason, the oil is fed from the oil passage 36 to the second hydraulic chamber 58 so that the oil pressure of the second hydraulic chamber 58 rises. Consequently, the piston 59 is moved to the right side of FIG. 9, and the oil is fed from the first hydraulic chamber 57 to the oil passage 38.

Then, when the oil pressure of the oil passage 36 rises, the oil pressure inputted to the control port 51 also rises so that the selector valve 46 is turned into ON state. As a result, the oil is fed from the oil passage 36 to the oil passage 38 through the input port 47 and the drain port 48. Thus, in case of occurrence of the fail in which the current cannot be applied to the solenoid valve 89 when the halted engine 1 is driven, it is possible to feed the oil to the oil passage 38 gently subsequent to feed the oil to the oil passage 38 rapidly.

Here will be explained a corresponding relation between the example to increase the amount of the oil fed to the oil passage 38 by the accumulator 56, and a comparative example to increase the amount of the oil fed to a predetermined oil passage by increasing a discharging capacity of the oil pump. One example of a relation between a flow rate of the oil discharged from the oil pump and the oil pressure of the oil passage (i.e., a line pressure) will be described first of all with reference to FIG. 10. As illustrated by a characteristic line in FIG. 10, the line pressure increases according to the increase in the flow rate of the oil.

Figure 11:
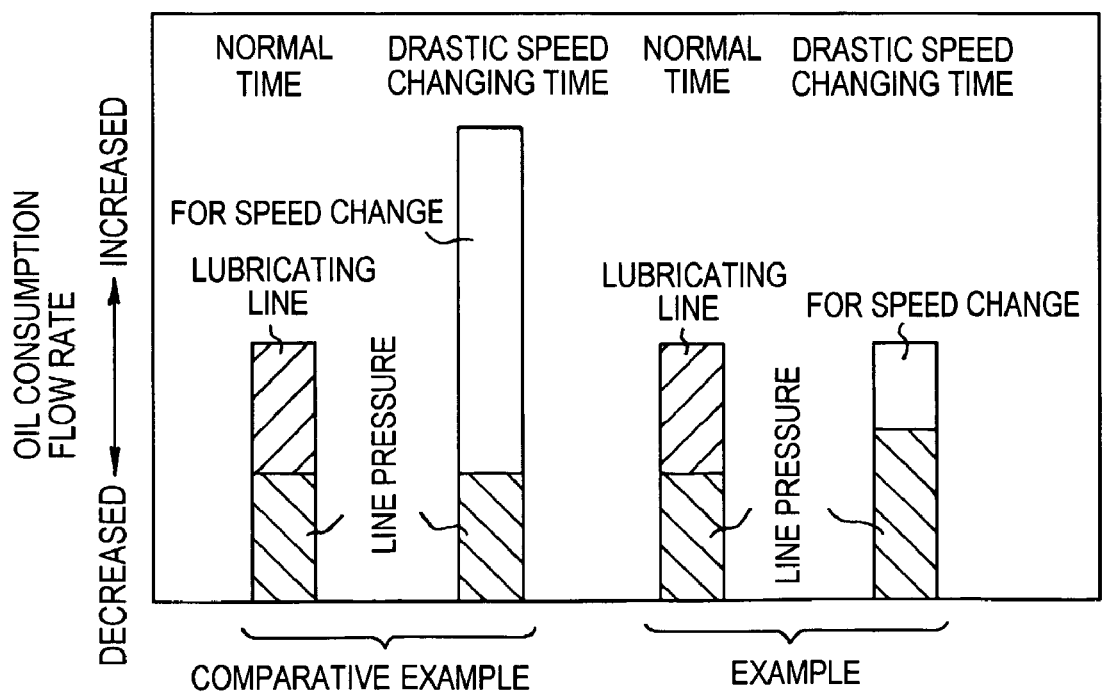
FIG. 11 is a graph showing the relation between consumption flow rates of the examples of the invention and a comparative example.

Next, a relation between a consumption flow rate of the oil corresponding to the comparative example and a consumption flow rate of the oil according to the example 8 will be described with reference to a graph of FIG. 11. In an overall consumption of the oil according to a normal time of the comparative example, a proportion of the oil consumed to keep the line pressure to the oil consumed by a lubricating system are substantially identical to each other. Here, the "normal time" represents a condition where the speed change ratio of the belt-type continuously variable transmission is kept substantially constant. On the other hand, in case the speed change ratio of the belt-type continuously variable transmission is changed drastically, a proportion of the oil consumed to keep the line pressure is also identical to that at the normal time. However, since the oil consumption of the hydraulic chamber of the belt-type continuously variable transmission increases at the drastic speed changing time, the overall consumption of the oil at the drastic speed changing time becomes larger than that at the normal time.

Meanwhile, the overall consumption of the oil at the normal time according to the example is identical to that of the comparative example, and a proportion of the oil consumed to keep the line pressure and a proportion of the oil consumed by the lubricating system are substantially identical to each other. The overall consumption of the oil at the drastic speed changing time according to the example is also identical to that at the normal time of the example. On the other hand, according to the example 8, the line pressure is raised by the function of the accumulator 56. Therefore, the amount of the oil consumed to establish the line pressure at the drastic speed changing time is larger than the amount of the oil consumed to establish the line pressure at the normal time. This is because the area of the end face 62 is larger than that of the end face 63, so that the oil amount discharged from the first hydraulic chamber 57 is larger than the oil amount fed to the second hydraulic chamber 58. For this reason, the oil pressure of the first hydraulic chamber 57 is lower than that of the second hydraulic chamber 58. Therefore, it is necessary to increase the oil amount fed to the second hydraulic chamber 58 so as to raise the oil pressure of the first hydraulic chamber 57.

Figure 10:
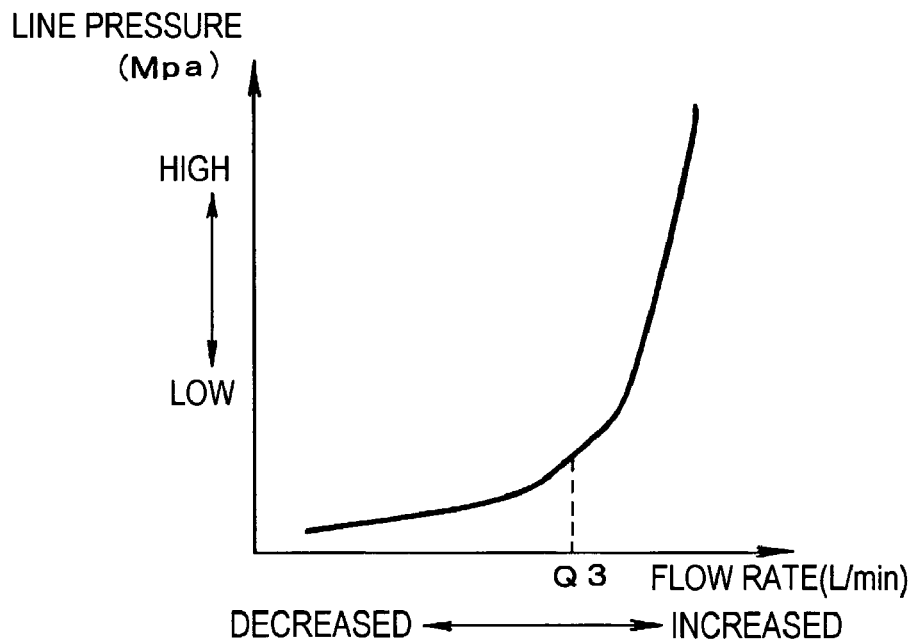
FIG. 10 is a diagram showing the corresponding relation between a line pressure and a flow rate of the oil in the examples.

However, with respect to the corresponding relation between the flow rate and the line pressure, a gradient of the rise in the line pressure becomes steeper from a preset value Q3, in comparison with the gradient wherein the flow rate is smaller than the preset value Q3, as illustrated in FIG. 10. Accordingly, as illustrated in the graph of FIG. 11, in case of raising the oil pressure of the belt-type continuously variable transmission to the predetermined pressure, the overall consumption of the oil is smaller in the example in which the line pressure itself is increased, in comparison with the comparative example in which the discharging amount of the oil pump is increased. In other words, the hydraulic control unit of the example is capable of reducing the discharging capacity of the oil pump in comparison with that of the comparative example. Therefore, the oil pump 30 can be downsized, and deterioration in the fuel economy of the engine 1 driving the oil pump 30 can be avoided. Additionally, the action explained with reference to FIGS. 1 and 10 corresponds also to the example 5.

EXAMPLE 9

Figure 12:
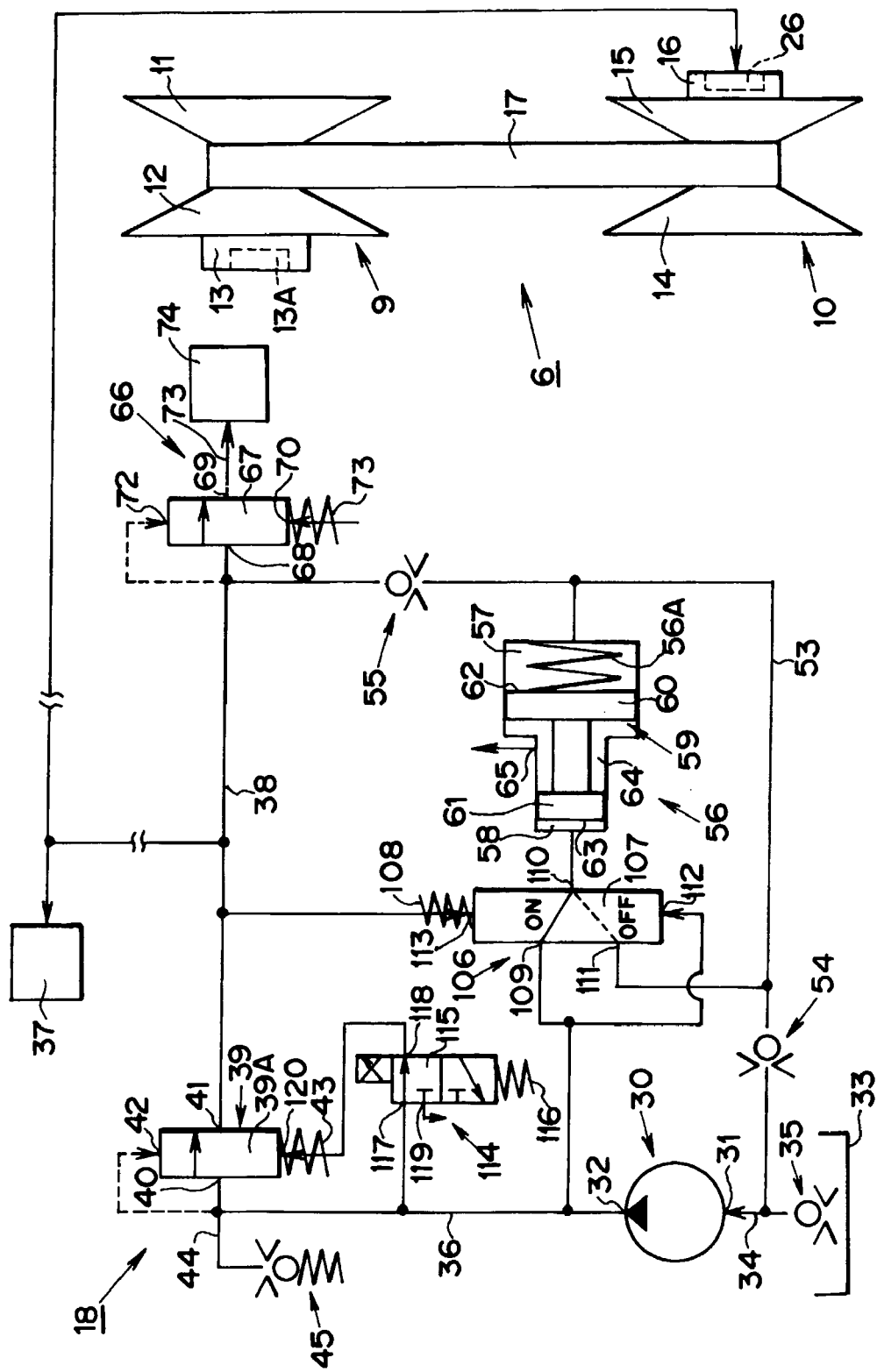
FIG. 12 is a conceptual diagram showing an example 9 of the hydraulic control unit of the invention.

Next, an example 9 of the hydraulic control unit 18 will be described with reference to FIG. 12. The structure of the hydraulic control unit 18 illustrated in FIG. 12 is basically identical to that of the hydraulic control unit 18 illustrated in FIG. 1. The difference between the hydraulic control units 18 illustrated in FIGS. 1 and 12 is that the structure of selector valve 106 controlling the accumulator 56. The selector valve 106 illustrated in FIG. 12 has a spool 107, an elastic member 108 for energizing the spool 107 in a predetermined direction, an input port 109, an output port 110, a drain port 111, control ports 112 and 113. The input port 109 and the control port 112 are connected with the oil passage 36, and the output port 110 is connected with the second hydraulic chamber 58. Also, the control port 113 is connected to the oil passage 38. An energizing force is applied to the spool 107 by the oil pressure of the control port 113 in the same direction as the energizing force applied by the elastic member 108. On the other hand, the spool 107 is energized by the oil pressure of the control port 112 in the direction opposite to the elastic member 108.

According to the hydraulic control unit 18 of FIG. 12, there is provided a solenoid valve 114 for controlling the regulating characteristics of the line-pressure control valve 39. The solenoid valve 114 is equipped with a spool 115, an elastic member 116, an input port 117, an output port 118 and a drain port 119. Moreover, the line-pressure control valve 39 is equipped with a control port 120. The oil pressure of the output port 118 is inputted to the control port 120, and energizing force is applied to the spool 39A by the oil pressure of the control port 120 in the same direction as the energizing force applied by the elastic member 43. Additionally, the input port 117 is connected with the oil passage 36. The solenoid valve 114 is a normal-close type solenoid valve: in which the input port 117 is shut off, and the output port 118 and the drain port 119 are connected when the current is not applied; and in which the input port 117 and the output port 118 are connected, and the drain port 119 is shut off when applying the current.

Next, here will be explained actions attained by the hydraulic control unit 18 illustrated in FIG. 12. In case the restarting condition is satisfied so that the halted engine 1 is started, the oil pump 30 is driven and the oil is fed to the oil passage 36. On the other hand, the current is applied to the solenoid valve 114, so that the oil pressure inputted from the oil passage 36 to the control port 120 increases. For this reason, an opening pressure of the line-pressure control valve 39 rises, and the oil pressure of the oil passage 36 rises within the range of the valve opening pressure. As a result, the oil pressure inputted from the oil passage 36 to the control port 112 of the selector valve 106 is raised.

Since the oil pressure of the oil passage 38 is low when starting the halted engine 1, on the other hand, the oil pressure of the control port 112 rises. Then, the spool 107 moves upward in FIG. 12. This is because the energizing force applied to the spool 107 by the oil pressure of the control port 112 is greater than the energizing force applied to the spool 107 by the elastic member 108 and the oil pressure of the control port 113. By this movement of spool 107, the input port 109 and the output port 110 of the selector valve 106 are connected with each other, and the drain port 111 is shut off. The situation, in which the input port 109 and the output port 110 of the selector valve 106 are thus connected with each other, and the drain port 111 is thus shut off, is called "ON state" of the selector valve 106. In case the selector valve 106 is turned into ON state, the oil of the oil passage 36 is fed to the second hydraulic chamber 58 of the accumulator 56 through the input port 109 and the output port 110. As a result of this, the oil of the first hydraulic chamber 57 is fed to the oil passage 38 and the hydraulic chambers 26 and 37, on the same principle as the example 1.

After the oil passage 38 is thus filled with the oil rapidly, power distribution to the solenoid valve 114 is stopped. Then, the valve opening pressure of the line-pressure control valve 39 is lowered, and the line-pressure control valve 39 is opened if the oil pressure of the oil passage 36 exceeds the valve opening pressure. Consequently, the oil of the oil passage 36 is fed to the oil passage 38 through the input port 40 and the drain port 41. As mentioned above, the oil pressure of the oil passage 38 is raised to the level almost equal to the oil pressure of the oil passage 36.

In case the oil is fed from the oil passage 36 to the oil passage 38 through the line-pressure control valve 39, on the other hand, the oil pressure of the oil passage 36 drops so that the oil pressure inputted to the control port 112 of the selector valve 106 is lowered. Then, when the energizing force of the elastic member 108 and the energizing force of the oil pressure of the control port 113 exceed the energizing force of the oil pressure of the control port 112, the spool 107 moves downward in FIG. 12. As a result of this, the output port 110 and the drain port 111 of the selector valve 106 are connected with each other, and the input port 109 is shut off. Thus, the situation, in which the output port 110 and the drain port 111 of the selector valve 106 are connected with each other, and the input port 109 is shut off, is called "OFF state" of the selector valve 106.

In case the selector valve 106 is turned into OFF state, in the accumulator 56, the oil pressure of the second hydraulic chamber 58 drops and the piston 59 is moved to the left side in FIG. 12 by the energizing force of the elastic member 56A. As a result of this, the oil is discharged from the second hydraulic chamber 58 to the oil passage 53 through the output port 110 and the drain port 111. Moreover, the oil is aspirated to the first hydraulic chamber 57 through the oil passage 53 on the same principle as the example 1. Thus, the effect similar to that of the example 1 can be attained also in the example 9, by feeding the oil from the first hydraulic chamber 57 of the accumulator 56 to the oil passage 38 when restarting the halted engine 1.

The aforementioned equality (2) can be satisfied also in the example 9, by setting the regulating characteristics of the line-pressure control valve 39 to satisfy the aforementioned formula (4). In the formula (4), PL1 represents the oil pressure of the oil passage 36, and PL2 represents the oil pressure of the oil passage 38. The same control as described in the example 5 is also practicable in the example 9. Specifically, it is possible to feed the oil from the first hydraulic chamber 57 to the oil passage 38, by controlling the solenoid valve 114 to switch the selector valve 106 from OFF state to ON state, in case a condition to change the speed change ratio of the belt-type continuously variable transmission 6 drastically, or in case a condition to increase the applying pressure of the frictional engagement devices of the forward/backward switching mechanism 5, is satisfied after the engine 1 is started. By this control, the effect similar to that of the example 5 can be attained. The action similar to that of the example 1 can also be attained by the construction of the example 9 in common with the example 1. The corresponding relation between the comparative example and the example described with reference to FIGS. 10 and 11 is also applicable in the example 9.

Here will be described the corresponding relation between the constructions of the example 9 and the invention. The selector valve 106 corresponds to the oil feeding amount control device of the invention. The corresponding relation between the remaining construction of the example 9 and the invention are identical to that between the example 1 and the invention.

EXAMPLE 10

Figure 13:
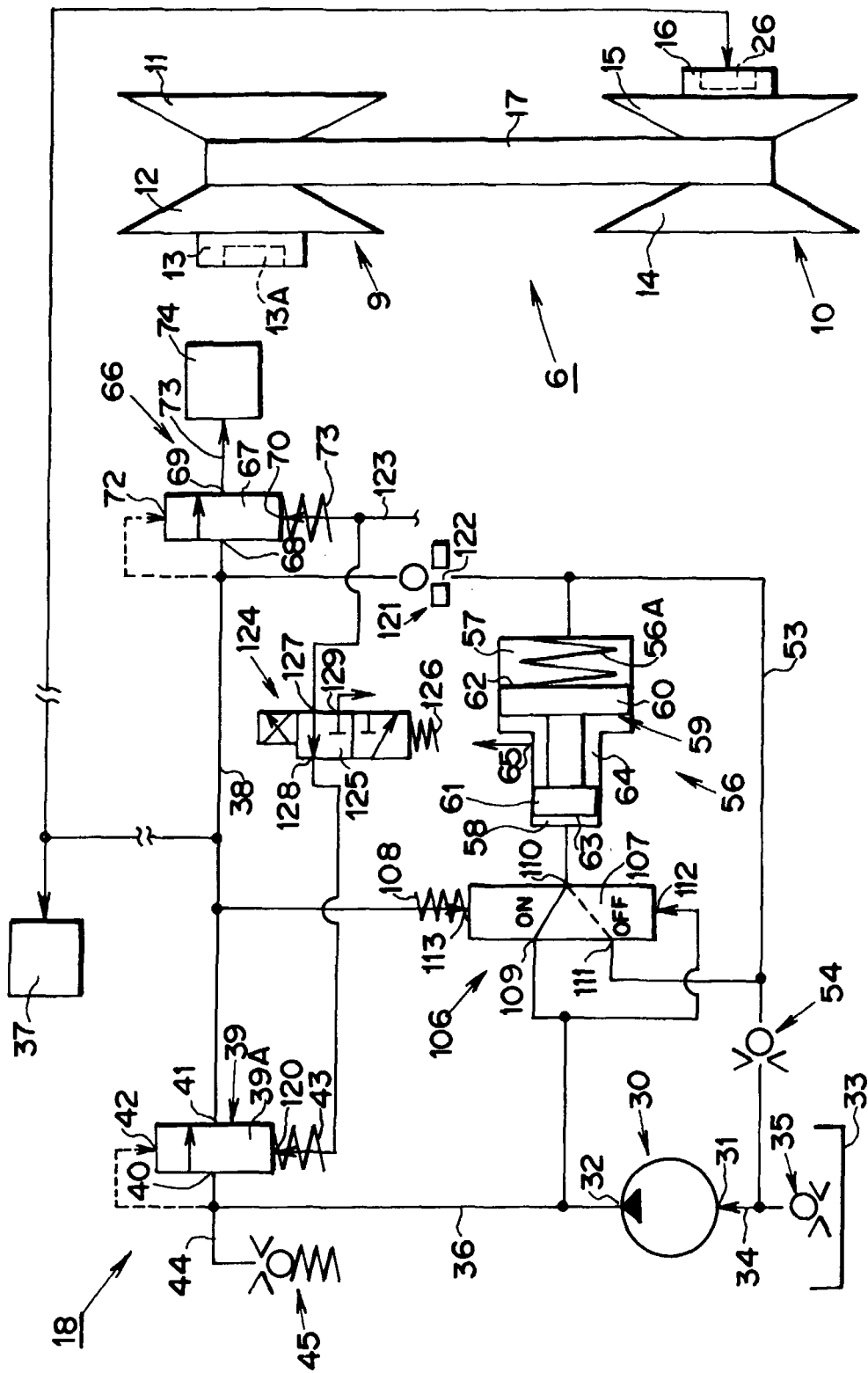
FIG. 13 is a conceptual diagram showing an example 10 of the hydraulic control unit of the invention.

Next, an example 10 of the hydraulic control unit 18 will be described with reference to FIG. 13. The hydraulic control unit 18 illustrated in FIG. 13 has a construction in common with that illustrated in FIG. 1. In FIG. 13, there is provided a selector valve 106 having the same construction as that of the selector valve 106 in FIG. 12, instead of the selector valve 46 illustrated in FIG. 1. In FIG. 13, moreover, a check valve 121 is arranged on the oil passage 53 instead of the check valve 55 in FIG. 1. This check valve 121 allows the oil to flow into the oil passage 38 from the oil passage 53, and prevents the oil from flowing back to the oil passage 53 from the oil passage 38. Additionally, the check valve 121 has an orifice 122.

Meanwhile, in FIG. 13, there is arranged an oil passage 123 for feeding control pressure to the control port 70 of the line-pressure control valve 66, and a solenoid valve 124 is provided on the oil passage between the oil passage 123 and the control port 120 of the line-pressure control valve 39. The solenoid valve 124 comprises a spool 125 energized by magnetic attraction force in a predetermined direction, an elastic member 126 for energizing the spool 125 in the direction opposite to the predetermined direction, an input port 127, an output port 128 and a drain port 129. The input port 127 is connected with the oil passage 123, and the output port 128 is connected with the control port 120. The solenoid valve 124 is a normal-close type solenoid valve: in which the input port 127 is shut off, and the output port 128 and the drain port 129 are connected with each other when current is not applied; and in which the input port 127 and the output port 128 are connected with each other, and the drain port 129 is shut off when applying current. The remaining construction of FIG. 13 is similar to that of FIG. 1.

According to the hydraulic control unit 18 of FIG. 13 as thus far described, in case the restarting condition is satisfied so that the halted engine 1 is driven, current is applied to the solenoid valve 124, and the signal oil pressure of the oil passage 123 is inputted to the control port 120 of the line-pressure control valve 39 through the solenoid valve 124. Consequently, the opening pressure of the line-pressure control valve 39 is raised.

When the engine 1 is driven, the oil is discharged from the oil pump 30 and fed to the oil passage 36, and the selector valve 106 is turned into ON state on the same principle as the example 9. Consequently, the oil is fed from the oil passage 36 to the second hydraulic chamber 58 of the accumulator 56. Then, the oil is discharged from the first hydraulic chamber 57 to the oil passage 53 on the same principle as the example 1, and at the same time, the oil is fed rapidly from the oil passage 53 to the oil passage 38 through the check valve 121. No current is applied to the solenoid valve 124 after the oil is thus fed to the oil passage 38 rapidly. As a result of this, the oil of the control port 120 is discharged from the drain port 129, so that the opening pressure of the line-pressure control valve 39 is lowered.

Then, the oil is discharged from the oil passage 36 to the oil passage 38 by the function of the line-pressure control valve 39 so that the oil pressures of the oil passage 36 and the oil passage 38 become substantially equal, and the selector valve 106 is turned into OFF state on the same principle as the example 9. Consequently, the oil is discharged from the second hydraulic chamber 58 to the oil passage 53 as the example 9, and the oil is aspirated to the first hydraulic chamber 57 through the oil passage 53 on the same principle as the example 1, so as to prepare for the next oil feeding.

The oil feeding condition expressed by the aforementioned equality (2) can also be achieved in the example 10, by controlling the regulating characteristics of the line-pressure control valve 39 to satisfy the formula (4), in case the solenoid valve 124 is in ON state. Moreover, the control described in the example 5 is also practicable in the example 10. Specifically, it is possible to feed the oil from the first hydraulic chamber 57 to the oil passage 38, by turning the solenoid valve 124 into ON state to raise the valve opening pressure of the line-pressure control valve 39 so as to turn the selector valve 106 into ON state, in case a condition to change the speed change ratio of the belt-type continuously variable transmission 6 drastically, or a condition to increase the applying pressure of the frictional engagement devices of the forward/backward switching mechanism 5, is satisfied after the engine 1 is started. By this control, the effect similar to that explained in the example 5 can be attained. In the example 10, actions and effects similar to those of the example 1 can be attained by the construction in common with the example 1. The corresponding relation between the comparative example and the example described with reference to FIGS. 10 and 11 is also applicable in the example 10.

Here is described a flow rate control of the case in which the oil is fed from the oil passage 53 to the oil passage 38, which is carried out by the check valve 121. According to the example 10, a control oil pressure is inputted to the control port 70 of the line-pressure control valve 66, and the control characteristics of the line-pressure control valve 66 to control the oil pressure of the oil passage 38 is varied according to the control oil pressure. That is, the oil pressure of the oil passage 38 rises according to the rise in the control oil pressure.

In case the solenoid valve 124 is turned into ON state, the control oil pressure of the oil passage 123 is inputted to the control port 120 of the line-pressure control valve 39, and the control characteristics of the line-pressure control valve 39 to control the oil pressure of the oil passage 36 is thereby changed. In this case, the oil is fed from the oil passage 36 to the second hydraulic chamber 58 of the accumulator 56 through the selector valve 106, so that the oil is fed from the first hydraulic chamber 57 to the oil passage 53. Thus, the control oil pressure of the oil passage 123 effects also on the oil pressure of the oil passage 36 as well as the oil pressure of the oil passage 53.

Figure 14:
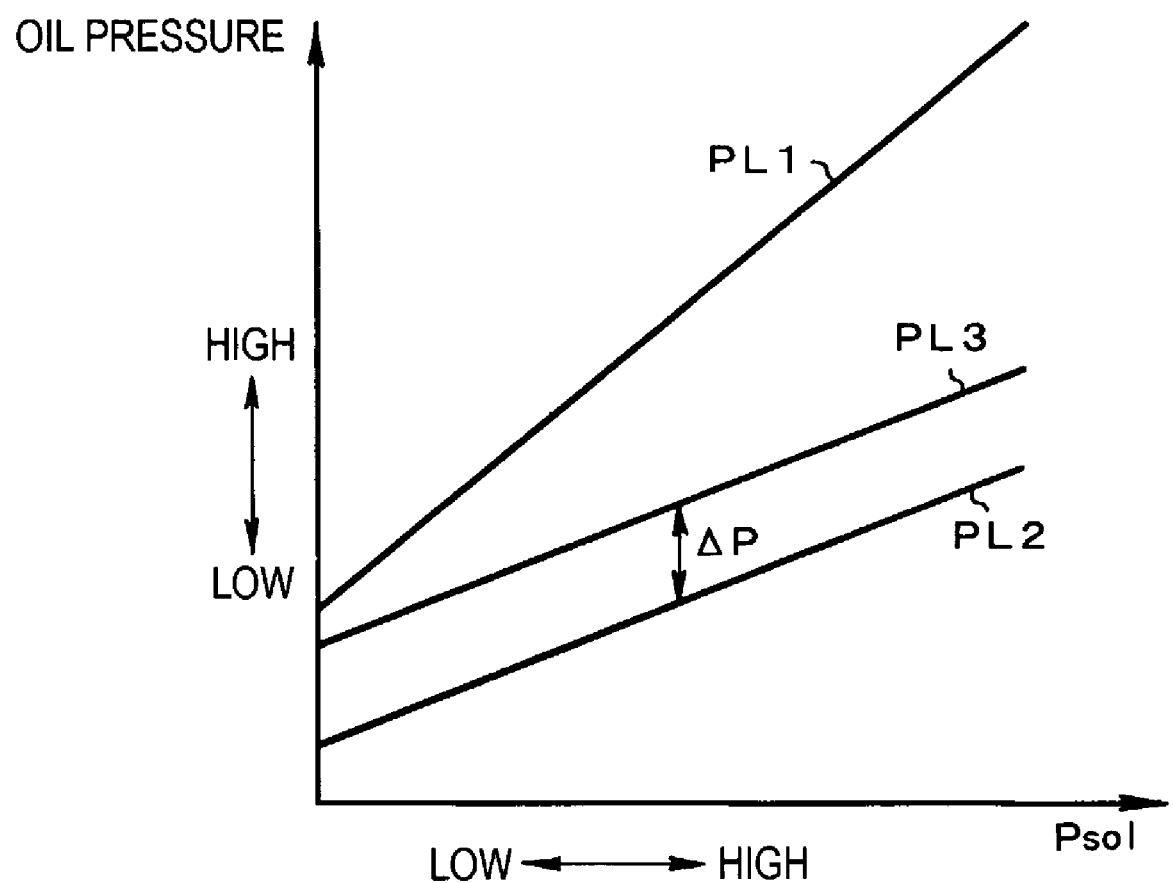
FIG. 14 is a characteristic diagram showing one example of the relation between a control oil pressure and oil pressures of individual oil passages in the hydraulic control unit illustrated in FIG. 13.

Here will be explained one example of a relation between the control oil pressure Psol of the oil passage 123, and the oil pressures PL1 of the oil passage 36, PL2 of the oil passage 38 and PL3 of the oil passage 53, with reference to the characteristic diagram of FIG. 14. As described above, the oil pressures PL1 of the oil passage 36, PL2 of the oil passage 38 and PL3 of the oil passage 53 rise according to the rise in the control oil pressure Psol of the oil passage 123. Since the oil is fed from the oil passage 36 to the second hydraulic chamber 58 so that the piston 59 is operated and the oil is discharged from the first hydraulic chamber 57 to the oil passage 53, and moreover, since the area B1 is larger than the area A1, the oil pressure PL3 of the oil passage 53 is lower than the oil pressure PL1 of the oil passage 36. Additionally, the oil of the oil passage 53 is depressurized when it is fed to the oil passage 38 through the orifice 122, so that the oil pressure PL2 of the oil passage 38 becomes lower than the oil pressure PL3 of the oil passage 53. For example, the oil pressure PL1 of the oil passage 36, the oil pressure PL2 of the oil passage 38 and the oil pressure PL3 of the oil passage 53 are expressed by the following formulas:

$$PL1 = K1 \cdot Psol + W1 \tag{5}$$

$$PL2 = K2 \cdot Psol + W2 \tag{6}$$

$$PL3 = (PL1 \cdot A1 - W - F)/B1. \tag{7}$$

Moreover, the oil pressure PL3 is expressed by the following formula:

$$PL3 = (K1 \cdot Psol + W1) \cdot A1/B1 - (W + F)/B1 \quad (8)$$
$$= K1 \cdot A1/B1 \cdot Psol + W1 \cdot A1/B1 - (W + F)/B1.$$

Furthermore, the pressure difference ΔP between the oil pressures PL2 and PL3 is expressed by the following formula:

ΔP=PL3−PL2

=(K1·Psol+W1)·A1/B1−(W+F)/B1−PL2

=(K1·A1/B1−K2)·Psol+W1·A1/B1−(W+F)/B1−W2. (9)

In the above formulas: "W" represents a force applied to the piston 59 by the elastic member 56A in the accumulator 56; "W1" represents a force applied to the spool 39A by the elastic member 43 in the line-pressure control valve 39; and "K1" and "K2" are coefficients.

Still moreover, a flow rate Q of the oil fed from the oil passage 53 to the oil passage 38 through the orifice 122 of the check valve 121 is expressed by the following formula.

$$Q = K \cdot C \cdot a \sqrt{(\Delta P/\rho)} \quad (10)$$

In this formula (10): K is a constant; "C" is a flow rate coefficient; "a" is the sectional area of the orifice 122; and "ρ" is a density of the oil. The flow rate Q can be set in accordance with the oil pressure PL2 using these formulas. For example, under the condition where the following formulas:

K1·A1/B1=K2 (11)

W≈const (Ws≈We: small spring coefficient) (12)

are satisfied, the pressure difference ΔP and the flow rate Q become substantially constant as expressed by the following formula:

ΔP≈const (13)

Q≈const. (14)

Specifically, the "the flow rate Q or a flow velocity of the oil fed to the oil passage 38 per unit of time" can be kept constant, by setting the sectional area "a" of the orifice 122, even in case the oil pressure PL2 varies. For example, it is possible to feed a required amount of the oil from the accumulator 56 to the oil passage 38 when the speed change is carried out drastically: by setting a capacity of the first hydraulic chamber 57 (area B1×stroke width) to a value corresponding to a variation in a capacity of the hydraulic chamber of the belt-type continuously variable transmission 6 (pressure receiving area of the piston connected with the pulley×maximum stroke width at speed changing time); and by setting the flow rate Q of the oil fed to the oil passage 38 to a value corresponding to a flow rate of the oil fed to the hydraulic chamber of the belt-type continuously variable transmission 6 when the speed change is carried out drastically (pressure receiving dimensions of the piston×maximum stroke width at speed changing time), in the above-mentioned formulas. Here, the corresponding relation of the construction between the example 10 and the invention is similar to that between the example 9 and the invention.

EXAMPLE 11

Figure 15:
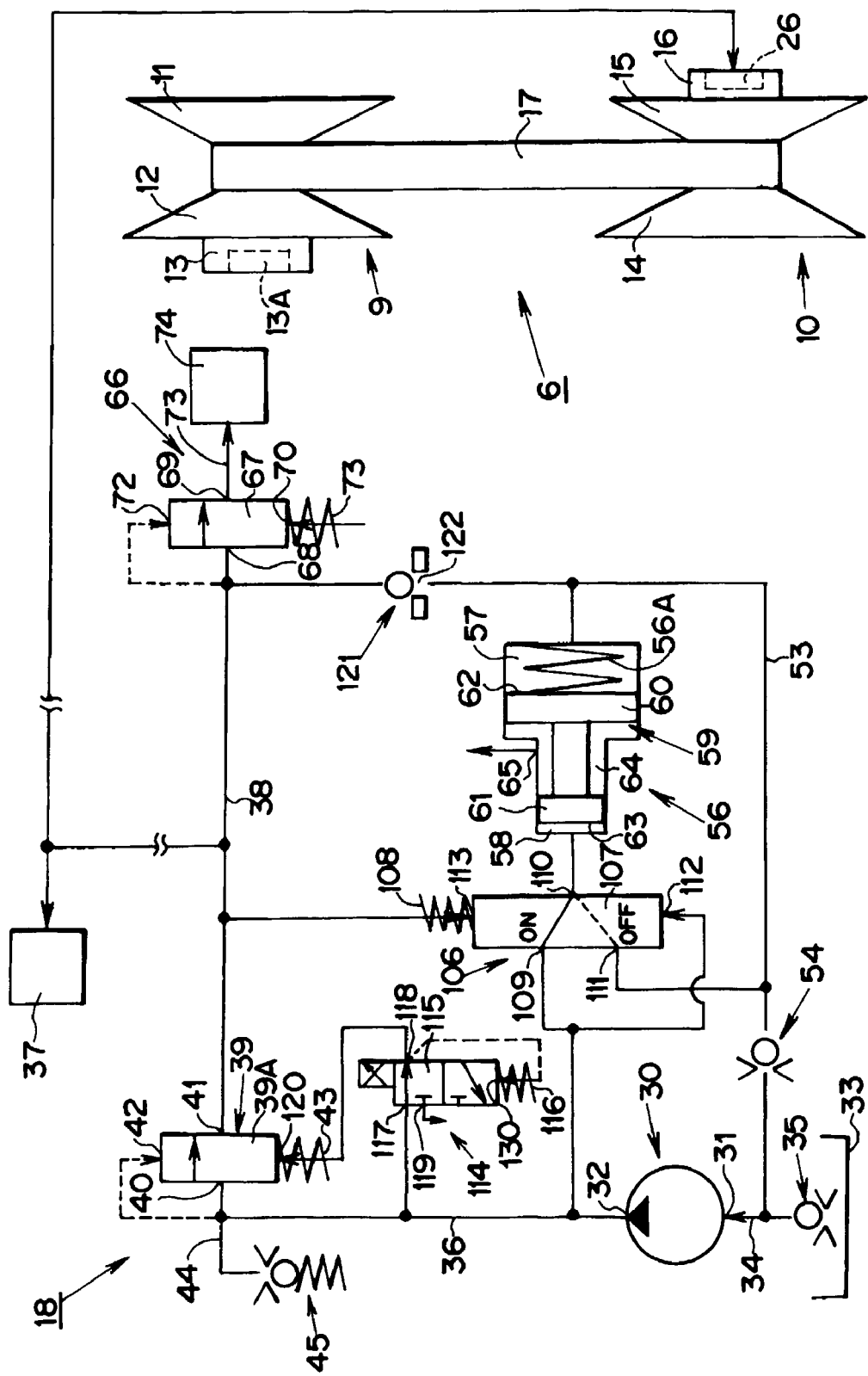
FIG. 15 is a conceptual diagram showing an example 11 of the hydraulic control unit of the invention.

Next, an example 11 of the hydraulic control unit 18 will be described with reference to FIG. 15. A construction of the hydraulic control unit 18 illustrated in FIG. 15 is similar to that illustrated in FIG. 12. In FIG. 15, there is provided a check valve 121 having the construction mentioned above, instead of the check valve 55 in FIG. 12. According to the hydraulic control unit 18 illustrated in FIG. 15, moreover, the line-pressure control valve 114 is provided with a feedback port 130 connected with the output port 118. The energizing force is applied to the spool 115 by the oil pressure of the feedback port 130, in the same direction as the energizing force applied by the elastic member 116.

Action attained by the hydraulic control unit 18 illustrated in FIG. 15 is similar to that attained by the hydraulic control unit 18 of FIG. 12. According to the hydraulic control unit 18 of FIG. 15, when the oil pressure of the output port 118 exceeds a predetermined pressure, the oil pressure inputted to the feedback port 130 also rises and the spool 115 is thereby moved. As a result, the amount of the oil fed from the oil passage 36 to the control port 120 of the line pressure control valve 39 is reduced, so that the control oil pressure inputted to the control port 120 is reduced. With respect to the accumulator 56, on the other hand, the oil is discharged from the first hydraulic chamber 57 to the oil passage 53 on the principle explained above, and then fed to the oil passage 38 through the orifice 122 of the check valve 121. Here, the oil pressure of the oil passage 38 is also regulated by the line pressure control valve 66, as the example 9.

According to the example 11, the flow rate of the oil fed to the oil passage 38 through the orifice 122 can be controlled as explained below. Specifically, according to the hydraulic control unit 18 illustrated in FIG. 15, following relations are satisfied.

PL1=K1·Psol1+W1 (15)

PL2=K2·Psol2+W2 (16)

Here, the aforementioned formula (7) is satisfied also in the example 11. In the example 11, the oil pressure PL3 is further expressed by the following formula:

$$PL3 = (K1 \cdot Psol1 + W1) \cdot A1/B1 - (W + F)/B1 \quad (17)$$
$$= K1 \cdot A1/B1 \cdot Psol1 + W1 \cdot A1/B1 - (W + F)/B1.$$

In the example 11, moreover, the pressure difference ΔP between the oil pressures PL2 and PL3 is expressed by the following formula:

ΔP=PL3−PL2

=(K1·Psol1+W1)·A1/B1−(W+F)/B1−PL2

=K1·A1/B1·Psol1+K2·Psol2+W1·A1/B1−(W+F)/B1−W2. (18)

In the above formulas, "Psol1" represents the control oil pressure inputted to the control port 120, and "Psol2" represents the control oil pressure inputted to the control port 70. The relation expressed by the formula (10) is satisfied also in the example 11. According to the example 11, moreover, the control oil pressure inputted to the control port 120 of the line pressure control valve 39, and the control oil pressure inputted to the control port 70 of the line pressure control valve 66 can be controlled individually, and can be set to the different values. Therefore, it is possible to regulate (or to change) the flow rate Q of the oil arbitrarily in accordance with the oil pressure PL2 of the oil passage 38.

For example, it is possible to feed the oil amount Q required by the oil passage 38 in accordance with the change in the "changing speed of the speed change ratio of the belt-type continuously variable transmission 6": by setting a capacity of the first hydraulic chamber 57 (area B1×stroke width) to a value corresponding to a variation in a capacity of the hydraulic chamber of the belt-type continuously variable transmission 6 (pressure receiving area of the piston connected with the pulley×maximum stroke width at speed changing time); and by setting the oil amount Q fed to the oil passage 38 to a value corresponding to a flow rate of the oil fed to the hydraulic chamber of the belt-type continuously variable transmission 6 when the speed change is carried out drastically (pressure receiving area of the piston×maximum stroke width at speed changing time), in the formulas explained above. The action and effect attained by the examples 1 and 9 can also be attained by the construction of the example 11 in common with those of the examples 1 and 9. Also, particulars explained with reference to FIGS. 10 and 11 are also applicable to the example 11. Moreover, the corresponding relation between the construction of the example 11 and the construction of the invention is similar to that between the example 9 and the invention.

EXAMPLE 12

Figure 16:
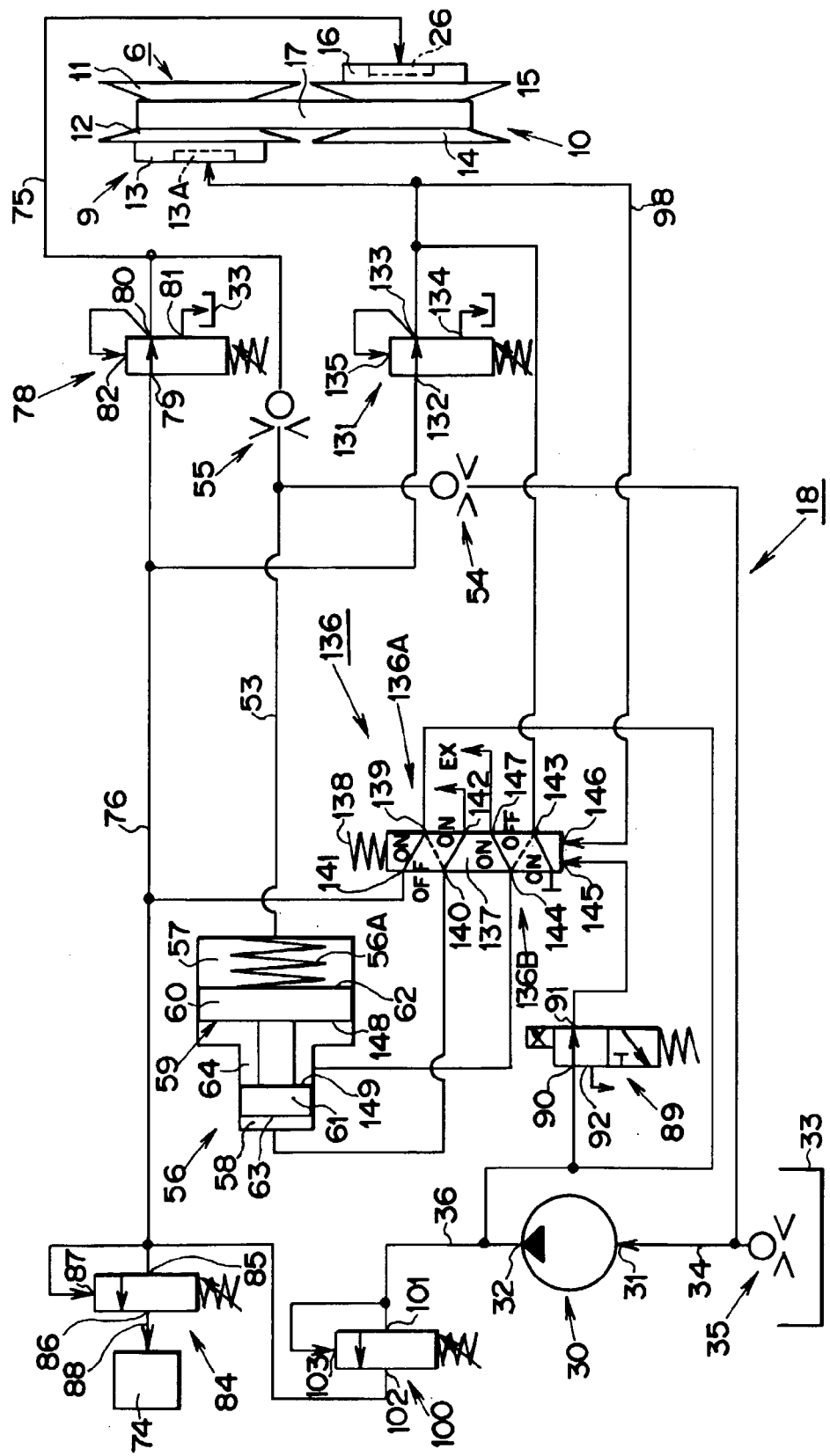
FIG. 16 is a conceptual diagram showing an example 12 of the hydraulic control unit of the invention.

Next, an example 12 of the hydraulic control unit 18 will be described with reference to FIG. 16. The construction illustrated in FIG. 16 is basically identical to that illustrated in FIG. 1. According to the hydraulic control unit 18 of FIG. 16, there is arranged a line pressure control valve 100 on the oil passage 36 between the oil pump 30 and the line pressure control valve 84. Construction and function of the line pressure control valve 100 are identical to those of the line pressure control valve 100 illustrated in FIG. 6.

On the other hand, there is arranged a primary sheave pressure control valve 131 on the route connecting the oil passages 76 and 98. The primary sheave pressure control valve 131 has an input port 132, an output port 133, a drain port 134, and a feedback port 135. The input port 132 is connected with the oil passage 76, the output port 133 and the feedback port 135 are connected with the oil passage 98, and the drain port 134 is connected with the oil pan 33. An application of the primary sheave pressure control valve 131 is to control the feeding amount of the oil fed from the oil passage 76 to the oil passage 98.

Moreover, there is provided a selector valve 136 for controlling a movement of the accumulator 56. The selector valve 136 has a construction different from that of the selector valves explained in other examples. Specifically, the selector valve 136 comprises: a spool 137 capable of reciprocating linearly; an elastic member 138 applying an energizing force to the spool 137 in a predetermined direction; an input port 139; output ports 140 and 141 connected selectively with the input port 139; a drain port 142 connected selectively with the output port 140; an input port 143; an output port 144 connected selectively with the input port 143; a drain port 147 connected selectively with the output port 144; and control ports 145 and 146. The input port 139 is connected with the oil passage 36; the output port 140 is connected with the second hydraulic chamber 58; the output port 141 is connected with the oil passage 76; the input port 143 is connected with the oil passage 98; the output port 144 is connected with an intermediate chamber 64; the control port 145 is connected with the output port 91; and the control port 146 is connected with the oil passage 98.

The direction of the force applied to the spool 137 by the oil pressures of the control ports 145 and 146 is opposite to the direction of the force applied to the spool 137 by the elastic member 138. For this reason, in the selector valve 136, a spring constant of the elastic member 138 is determined to control the movement of the spool 137, which is governed by the relation between the force applied by the oil pressures of the control ports 145 and 146 and the force applied by the elastic member 138, in order to connect and disconnect the ports selectively. Additionally, a first switching mechanism 136A is constructed of the input port 139, the output ports 140 and 141, and the drain port 142; and a second switching mechanism 136B is constructed of the input port 143, the output port 144, and the drain port 147.

On the other hand, in the accumulator 56, an end face 148 is formed on a diametrically large portion 60, and an end face 149 is formed on a diametrically small portion 61. The end faces 148 and 149 are positioned on both sides of the intermediate chamber 64 in the axial direction of the piston 59, so that the oil pressure of the intermediate chamber 64 acts on the end faces 148 and 149. A planar dimension of the end face 148 is identical to that of the end face 62, and a planar dimension of the end face 149 is identical to that of the end face 63. That is, an area of the end face 148 is larger than that of the end face 149, and the directions of the forces applied to the piston 59 by the oil pressure in the axial direction through the end face 148 and 149 are opposite to each other. For this reason, a force corresponding a value, which is obtained by multiplying a difference between the areas of the end faces 148 and 149 by the oil pressure of the intermediate chamber 64, is applied to the piston 59.

Next, here is explained the actions attained by the hydraulic control unit 18 illustrated in FIG. 16. When the engine 1 is halted, the solenoid valve 89 is controlled to connect the output port 91 and the drain port 92, and to shut off the input port 90. Therefore, the oil of the control port 145 of the selector valve 136 is discharged from the drain port 92, so that the oil pressure of the control port 145 drops. Moreover, the oil drains from the hydraulic chamber 13A so that the oil pressures of the hydraulic chamber 13A and the control port 146 are lowered.

Consequently, in the first switching mechanism 136A, the input port 139 and the output port 141 are connected with each other, and the output port 140 and the drain port 142 are connected with each other. In short, the first switching mechanism 136A is turned into ON state. In case the first switching mechanism 136A is turned into ON state, the oil of the second hydraulic chamber 58 is discharged from the drain port 142, and the pressure of the second hydraulic chamber 58 becomes atmospheric pressure. On the other hand, the input port 143 is shut off, and the output port 144 and the drain port 147 are connected with each other, so that the second switching mechanism 136B is turned into ON state. In case the second switching mechanism 136B is in ON state, the oil of the intermediate chamber 64 is discharged from the drain port 147, so that the pressure of the intermediate chamber 64 becomes atmospheric pressure. As a result, in the accumulator 56, the piston 59 is moved to the left side in FIG. 16 by the energizing force of the elastic member 56A, so that the oil is aspirated to the first hydraulic chamber 57 through the oil passage 53.

Then, in case the restarting condition is satisfied so that the halted engine 1 is driven, the solenoid valve 89 is controlled to connect the input port 90 and the output port 91, and to shut off the drain port 92. Consequently, the oil discharged from the oil pump 30 is fed to the control port 145 through the oil passage 36, the input port 90 and the output port 91, so that the oil pressure of the control port 145 is raised. When the oil pressure of the control port 145 rises, the input port 139 and the output port 140 are connected with each other, and the drain port 142 is shut off in the first switching mechanism 136A. That is, the first switching mechanism 136A is turned into OFF state. In case the first switching mechanism 136A is thus turned into OFF state, the oil is fed from the oil passage 36 to the second hydraulic chamber 58 through the input port 139 and the output port 140 so that the oil pressure of the second hydraulic chamber 58 is raised. At this moment, since the oil pressure of the hydraulic chamber 13A is low, the control oil pressure of the control port 146 is low. Therefore, the second switching mechanism 136B is kept to ON state. When the oil pressure of the second hydraulic chamber 58 is thus raised as mentioned above, the oil is fed from the first hydraulic chamber 57 to the hydraulic chamber 26 through the oil passage 53 on the principle described above.

As the aforementioned examples, a part of the oil in the oil passage 36 is fed to the oil passage 76 through the line pressure control valve 100, and the oil of the oil passage 76 is also fed to the oil passage 75. Meanwhile, a part of the oil of the oil passage 76 is fed to the hydraulic chamber 13A through the primary sheave pressure control valve 131 and the oil passage 98. The feeding amount of the oil fed to the hydraulic chamber 13A is thereby increased. In case the oil pressure of the oil passage 98 is lower than the predetermined pressure, the input port 132 and the output port 133 are connected with each other, and the drain port 134 is shut off in the primary sheave pressure control valve 131. Therefore, the oil is kept fed from the oil passage 76 to the hydraulic chamber 13A.

On the contrary, in case the oil pressure of the oil passage 98 exceeds the predetermined pressure, the input port 132 is shut off, and the output port 133 and the drain port 134 are connected with each other. Consequently, the oil in the hydraulic chamber 13A is discharged from the drain port 134, so that the pressure rise in the oil pressure of the hydraulic chamber 13A is suppressed, or the oil pressure is lowered. Thus, the primary sheave pressure control valve 131 is operated by the oil pressure of the hydraulic chamber 13A, and the flow rate of the oil fed from the oil passage 76 to the hydraulic chamber 13A is controlled.

In case the oil pressures of the oil passages 36 and 76 becomes substantially equal after the aforementioned rapid oil filling of the hydraulic chamber 26, the solenoid valve is controlled to shut off the input port 90, and to connect the output port 91 and the drain port 92. As a result, the oil pressure of the control port 145 of the selector valve 136 drops, and the first switching mechanism 136A returns to ON state. Then, the oil is fed from the oil passage 36 to the oil passage 76 through the input port 139 and the output port 141, and at the same time, the oil of the second hydraulic chamber 58 is discharged from the drain port 142 so that the oil pressure of the second hydraulic chamber 58 drops. Consequently, the oil is aspirated to the first hydraulic chamber 57 on the principle explained above. Additionally, the action and effect attained by the aforementioned examples can also be attained by the construction of the example 12 in common with those of the aforementioned examples.

Moreover, according to the example 12, in case the condition to change the speed change ratio of the belt-type continuously variable transmission 6 drastically is satisfied after the engine 1 is started, the oil pressure of the hydraulic chamber 26 is raised, and the groove width of the primary pulley 9 is widened by the tension of the belt 17 so that the piston of the primary pulley 9 is operated and the oil pressure of the hydraulic chamber 13A is raised. As a result, the oil pressure inputted to the control port 146 of the selector valve 136 via the oil passage 98 is also raised. In case the second switching mechanism 136B is turned into ON state, in which the input port 143 and the output port 144 are connected with each other, and in which the drain port 147 is shut off, the oil pressure of the hydraulic chamber 13A is transmitted to the intermediate chamber 64 of the accumulator 56 through the oil passage 98, the input port 143, and the output port 144. As a result, the oil pressure of the intermediate chamber 64 is raised.

When the oil pressure of the intermediate chamber 64 is thus raised, the energizing force to move the piston 59 to the right side in FIG. 16 is increased so that the piston 59 is moved to the right. Consequently, the oil is discharged from the first hydraulic chamber 57 to the oil passage 53. This enables to increase the feeding amount of the oil to the hydraulic chamber 26 drastically when a drastic speed change operation of the belt-type continuously variable transmission 6 is carried out. Therefore, the same effect as the aforementioned examples can be attained. In case the oil pressure of the hydraulic chamber 13A drops, the oil pressure acts on the control port 146 drops also. Consequently, the second switching mechanism 136B is turned into OFF state, in which the input port 143 is shut off and in which the output port 144 and the drain port 147 are connected with each other.

Additionally, according to the example 12, it is possible to operate the piston 59 by the energizing force of the oil pressure of the intermediate chamber 64 so as to feed the oil from the first hydraulic chamber 57 to the hydraulic chamber 26, by controlling the oil pressure PL1 of the oil passage 36 as expressed by the following inequality.

$$PL1 > (Psecfull \cdot B1 + We + F)/A1 - (Ppri \cdot (B1 - A1))/A1 \quad (19)$$

In the formula (19), Psecfull represents the oil pressure to be fed to the hydraulic chamber 26 via the oil passage 53, and Ppri represents the oil pressure the hydraulic chamber 13A. Also, the term "(Ppri·(B1−A1))" represents the thrust to move the piston 59 by the oil pressure of the intermediate chamber 64 to the right side in FIG. 16. According to the example 12, the oil pressure PL1 of the oil passage 36 can be lowered in the amount corresponding to the term "(Ppri·(B1−A1))" when moving the piston 59 to the right side in FIG. 16, in comparison with the construction in which the oil pressure is not inputted from the hydraulic chamber 13A to the intermediate chamber 64. This is because the planer dimension of the end face 148 is larger than that of the end face 63. Accordingly, power loss resulting from the operation of the oil pump 30 can be reduced.

Here will be explained the corresponding relation between the example 12 and the invention. The intermediate chamber 64 corresponds to a third hydraulic chamber of the invention; the oil passage 98 and the selector valve 136 correspond to a oil introduction passage of the invention; and the end face 148 corresponds to a third pressure-receiving face of the invention.

INDUSTRIAL APPLICABILITY

This invention can be utilized in the field of manufacturing power transmission systems operated by the oil pressure, and vehicles having the power transmission system.

The invention claimed is:
1. A hydraulic control unit, which has a power transmission system arranged on a route from a prime mover to a wheel, an oil receiving device to which oil is fed and which controls a power transmitting condition of the power transmission system on the basis of a feeding condition of the oil, and an oil reserving device for feeding the oil to the oil receiving device, wherein the oil reserving device comprises:
a first hydraulic chamber, which is connected with the oil receiving device, and a second hydraulic chamber, which is positioned on the other side of the first hydraulic chamber across a piston capable of moving between the first and the second hydraulic chambers;

wherein the piston has a first pressure receiving face forming the first hydraulic chamber and a second pressure receiving face forming the second hydraulic chamber, and an area of the first pressure receiving face is larger than that of the second pressure receiving face;

further comprising:

an oil pump, which is driven by the prime mover to establish oil pressure;

an oil feeding amount control device for feeding the oil in the first hydraulic chamber to the oil receiving device, by raising the oil pressure in the second hydraulic chamber to operate the piston; and wherein the oil feeding amount control device includes a selector valve for connecting the discharge outlet of the oil pump with the second hydraulic chamber until the oil pressure discharged from the first hydraulic chamber reaches a preset value, and for disconnecting the discharge outlet of the oil pump with the second hydraulic chamber after the oil pressure discharged from the first hydraulic chamber reaches the preset value.

2. The hydraulic control unit as set forth in claim 1, wherein:

the piston comprises a diametrically large portion and a diametrically small portion arranged integrally and coaxially;

the diametrically large portion is housed in the first hydraulic chamber liquid-tightly and movably back and forth, and the diametrically small portion is housed in the second hydraulic chamber liquid-tightly and movably back and forth; and a face of the diametrically large portion facing the first hydraulic chamber is the first pressure receiving face, and a face of the diametrically small portion facing the second hydraulic chamber is the second pressure receiving face.

3. The hydraulic control unit as set forth in claim 2, wherein:

the power transmission system includes a continuously variable transmission, which has an input side primary pulley wherein a groove width thereof is varied by a hydraulic servomechanism, an output side secondary pulley wherein a groove width thereof is varied by another hydraulic servomechanism, and a belt applied to those pulleys, and in which speed change ratio is varied continuously by changing the groove widths between the pulleys;

the oil receiving device includes the hydraulic servomechanism of the secondary pulley; and further comprising:

a third hydraulic chamber housing a rod portion connecting the diametrically large portion and the diametrically small portion; and a valve mechanism for feeding the oil pressure of the hydraulic servomechanism of the primary pulley selectively to the third hydraulic chamber.

4. The hydraulic control unit as set forth in claim 1, wherein:

the prime mover includes an engine;

the oil feeding amount control device comprises an oil suction inlet connected with a discharge outlet of the oil pump, and an oil discharge outlet connected with the second hydraulic chamber; and a flow rate of the oil fed from the oil suction inlet to the second hydraulic chamber through oil discharge outlet is increased when the halted engine is started.

5. The hydraulic control unit as set forth in claim 1, wherein the selector valve comprises a valve element pushed by an elastic member in one direction, and a control port to which the oil pressure is applied from the first hydraulic chamber to push the valve element to the elastic member side; and further comprising:

an oil passage connecting the first hydraulic chamber and the control port; and a one-way valve, which is arranged on the oil passage, and which allows an operating oil to flow from the first hydraulic chamber to the control port.

6. The hydraulic control unit as set forth in claim 5, further comprising:

a pressure control valve for regulating the oil pressure discharged from the oil pump and for feeding the regulated oil pressure to the oil receiving device;

an oil passage for feeding the operating oil discharged from the oil pump divergingly to the selector valve and to the pressure control valve; and an oil passage for applying the oil pressure outputted from the pressure control valve to the control port.

7. The hydraulic control unit as set forth in claim 6, wherein:

the oil reserving device discharges the operating oil by moving the piston to the first hydraulic chamber side before the operating oil is discharged through the pressure control valve.

8. The hydraulic control unit as set forth in claim 1, further comprising:

an elastic member for pushing the piston to the second hydraulic chamber side to increase a capacity of the first hydraulic chamber; and a circulating oil passage connecting the first and the second hydraulic chambers.

9. The hydraulic control unit as set forth in claim 8, wherein:

the selector valve comprises an output port connected with the second hydraulic chamber, and a drain port connected selectively with the output port; and the circulating oil passage is connected with the drain port.

10. The hydraulic control unit as set forth in claim 8, further comprising:

an oil pan for reserving the oil;

a one-way valve, which is arranged on an oil passage connecting the circulating oil passage and the oil pan, and which allows the oil to flow from the oil pan side to the circulating oil passage side.

11. The hydraulic control unit as set forth in claim 1, further comprising:

a line pressure control valve in which a pressure regulating level to set an output pressure is variable;

an opening/closing valve mechanism, which is arranged on an oil passage from the oil pump to the line pressure control valve, and which opens when the discharge pressure of the oil pump rises to a predetermined pressure to distribute the oil pressure from the oil pump to the line pressure control valve;

a pressure control valve for regulating the oil pressure based on the oil pressure regulated by the line pressure control valve and for feeding the regulated oil pressure to the oil receiving device, in which the pressure regulating level thereof is variable;

wherein the first hydraulic chamber is connected with the output side of the pressure control valve;

wherein the selector valve comprises a valve element pushed by an elastic member in one direction, and a control port to which the oil pressure is applied from the oil receiving device; and wherein the selector valve feeds the oil pressure discharged from the oil pump to the second hydraulic chamber in case the oil pressure of the oil receiving device is relatively low, and connects the second hydraulic chamber with the drain port to feed the oil pressure discharged from the oil pump to the input side of the pressure control valve in case the oil pressure of the oil receiving device is relatively high.

12. The hydraulic control unit as set forth in claim 11, wherein:

the opening/closing valve mechanism includes a one-way valve which opens when the oil pressure fed from the oil pump to the second hydraulic chamber through the selector valve rises to the predetermined pressure.

13. The hydraulic control unit as set forth in claim 11, wherein:

the opening/closing valve mechanism includes an opening/closing valve comprising a valve element which opens and closes alternatively, an elastic member for pushing the valve element to close, and a control port for applying an input pressure in the counter direction of the energizing force applied by the elastic member to open the valve element.

14. The hydraulic control unit as set forth in claim 1, further comprising:

a solenoid valve for outputting signal pressure to operate the selector valve.

15. The hydraulic control unit as set forth in claim 14, further comprising:

a control means for controlling the solenoid valve to output the signal pressure to operate the selector valve so as to connect the oil pump and the second hydraulic chamber until the oil pressure of the first hydraulic chamber rises to the predetermined pressure in case the oil pump is driven by restarting a halted prime mover, and to output the signal pressure to operate the selector valve so as to disconnect the oil pump and the second hydraulic chamber after the oil pressure of the first hydraulic chamber rises to the predetermined pressure.

16. The hydraulic control unit as set forth in claim 15:

wherein the power transmission system includes a continuously variable transmission, which has a primary pulley wherein a groove width thereof is varied by a hydraulic servomechanism, a secondary pulley wherein a groove width thereof is varied by another hydraulic servomechanism, and a belt applied to those pulleys, and in which a speed change ratio is varied continuously by changing the groove width between the pulleys;

wherein the oil receiving device includes the hydraulic servomechanisms; and further comprising:

another selector valve for feeding the operating oil discharged from the first hydraulic chamber selectively to any of the hydraulic servomechanisms.

17. The hydraulic control unit as set forth in claim 14, wherein:

the power transmission system includes a continuously variable transmission, which has an input side primary pulley wherein a groove width thereof is varied by a hydraulic servomechanism, an output side secondary pulley wherein a groove width thereof is varied by another hydraulic servomechanism, and a belt applied to those pulleys, and in which speed change ratio is varied continuously by changing the groove width between the pulleys;

the oil receiving device includes the hydraulic servomechanism of the secondary pulley; and the solenoid valve outputs the signal pressure to operate the selector valve so as to feed the oil pressure from the oil pump to the second hydraulic chamber, in case a power distribution to the solenoid valve is cut off.

18. The hydraulic control unit as set forth in claim 1, further comprising:

a pressure control valve for regulating the oil pressure discharged from the oil pump in accordance with the pressure regulating level, and for outputting the regulated oil pressure therefrom;

a solenoid valve for outputting the signal pressure to set the pressure regulating level based on the oil pressure fed from the oil pump to the second hydraulic chamber and the pressure control valve; and a selector valve, which feeds the operating oil discharged from the oil pump to the second hydraulic chamber when the discharge pressure of the oil pump is lower than the oil pressure to open the pressure control valve, and which disconnects the second hydraulic chamber with the oil pump when the discharge pressure of the oil pump rises to the pressure to open pressure control valve.

19. The hydraulic control unit as set forth in claim 18:

wherein the selector valve comprises a valve element pushed by an elastic member in one direction, a first control port to which the oil pressure is applied from the first hydraulic chamber or from the oil receiving device to push the valve element in the same direction as the energizing force applied by the elastic member, and a second control port to which the discharge pressure of the oil pump is applied to push the valve element in the counter direction of the energizing force applied by the elastic member; and further comprising:

an oil passage connecting the first hydraulic chamber and the first control port; and a one-way valve, which is arranged on the oil passage, and which allows the operating oil to flow from the first hydraulic chamber to the first control port.

20. The hydraulic control unit as set forth in claim 19, further comprising:

an oil passage for applying the oil pressure outputted from the pressure control valve to the first control port.

21. The hydraulic control unit as set forth in claim 18, further comprising:

an elastic member for pushing the piston to the second hydraulic chamber side so as to increase a capacity of the first hydraulic chamber; and a circulating oil passage connecting the first and the second hydraulic chambers.

22. The hydraulic control unit as set forth in claim 21, wherein:

the selector valve comprises an output port connected with the second hydraulic chamber, and a drain port connected selectively with the output port; and the circulating oil passage is connected with the drain port.

23. The hydraulic control unit as set forth in claim 22, further comprising:

an oil pan for reserving the oil; and a one-way valve, which is arranged on an oil passage connecting the circulating oil passage and the oil pan, and which allows the oil to flow from the oil pan side to the circulating oil passage side.

24. The hydraulic control unit as set forth in claim 18, further comprising:
a further pressure control valve for regulating the oil pressure outputted from the pressure control valve to the oil pressure corresponding to the pressure regulating level governed by the signal pressure fed to its control port; and
wherein the signal pressure outputted from the solenoid valve is fed to the control port of the pressure control valve.

25. The hydraulic control unit as set forth in claim 18, wherein:
the solenoid valve includes a valve capable of varying its output pressure continuously in accordance with an electronic signal.

26. A hydraulic control unit, which has a power transmission system arranged on a route from a prime mover to a wheel, an oil receiving device to which oil is fed and which controls a power transmitting condition of the power transmission system on the basis of a feeding condition of the oil, and an oil reserving device for feeding the oil to the oil receiving device:
wherein the oil reserving device comprises:
a first hydraulic chamber, which is connected with the oil receiving device, and
a second hydraulic chamber, which is positioned on the other side of the first hydraulic chamber across a piston capable of moving between the first and the second hydraulic chambers;
wherein the piston has a first pressure receiving face forming the first hydraulic chamber and a second pressure receiving face forming the second hydraulic chamber, and a planer dimension of the first pressure receiving face is larger than that of the second pressure receiving face;
further comprising:
an oil pump, which is driven by the prime mover to establish oil pressure;
an oil feeding amount control device for feeding the oil in the first hydraulic chamber to the oil receiving device, by raising the oil pressure in the second hydraulic chamber to operate the piston;
a circulating oil passage connecting the first hydraulic chamber and the second hydraulic chamber;
an oil pan for reserving the oil; and
a one-way valve, which is arranged on an oil passage connecting the circulating oil passage and the oil pan and which allows the oil to flow from the oil pan side to the circulating oil passage side; and
wherein the oil feeding amount control device includes the oil passage connecting the discharge outlet of the oil pump and the second hydraulic chamber;
wherein the piston includes a diametrically large portion and a diametrically small portion arranged integrally and coaxially;
the diametrically large portion is housed in the first hydraulic chamber liquid-tightly and movably back and forth, and the diametrically small portion is housed in the second hydraulic chamber liquid-tightly and movably back and forth; and
a face of the diametrically large portion facing the first hydraulic chamber is the first pressure receiving face, and a face of the diametrically small portion facing the second hydraulic chamber is the second pressure receiving face.

27. The hydraulic control unit as set forth in claim 26, further comprising:
a pressure control valve for regulating the oil pressure discharged from the oil pump and for feeding the regulated oil pressure to the oil receiving device; and
an oil passage for feeding the operating oil discharged from the oil pump divergingly to a selector valve and to the pressure control valve.

28. The hydraulic control unit as set forth in claim 27, wherein:
the oil reserving device discharges the operating oil by moving the piston to the first hydraulic chamber side, before the operating oil is discharged through the pressure control valve.

29. The hydraulic control unit as set forth in claim 27, further comprising:
a one-way valve, which is arranged on the oil passage for feeding the oil pressure from the oil pump to the pressure control valve, and which allows the operating oil to flow from the oil pump to the pressure control valve; and
wherein the one-way valve opens when the discharge pressure of the oil pump rises after the piston moves to the first hydraulic chamber side.

30. The hydraulic control unit as set forth in claim 29, further comprising:
another pressure control valve for further regulating the oil pressure outputted from the pressure control valve and feeding the further regulated oil pressure to the oil receiving device; and
wherein the first hydraulic chamber is connected with the output side of the another pressure control valve through the one-way valve.

\* \* \* \* \*